US005825886A

United States Patent [19]

Adams et al.

[11] Patent Number: 5,825,886
[45] Date of Patent: Oct. 20, 1998

[54] CONSTRUCTION SYMMETRIC CIPHERS USING THE CAST DESIGN PROCEDURE

[75] Inventors: Carlisle Michael Adams; Michael James Wiener, both of Ottawa; Roland Thomas Lockhart, Kanata, all of Canada

[73] Assignee: Entrust Technologies Ltd., Ottawa, Canada

[21] Appl. No.: 761,763

[22] Filed: Dec. 5, 1996

[30] Foreign Application Priority Data

Dec. 8, 1995 [CA] Canada ................................ 2164768

[51] Int. Cl.$^6$ ................................ H04L 9/28; H04L 9/06
[52] U.S. Cl. .................................... 380/28; 380/6; 380/9; 380/29; 380/37; 380/43
[58] Field of Search .............................. 380/6, 9, 28, 29, 380/30, 33, 37, 43, 49, 50

[56] References Cited

U.S. PATENT DOCUMENTS

| | | | |
|---|---|---|---|
| 4,275,265 | 6/1981 | Davida et al. | 380/29 |
| 4,802,217 | 1/1989 | Michener | 380/29 |
| 5,214,703 | 5/1993 | Massey et al. | 380/37 |
| 5,511,123 | 4/1996 | Adams | 380/29 |

FOREIGN PATENT DOCUMENTS

| | | | |
|---|---|---|---|
| 0618701 | 10/1994 | European Pat. Off. | H04L 9/06 |
| WO91/18459 | 11/1991 | WIPO | H04L 9/06 |

OTHER PUBLICATIONS

"Fast Data Encipherment Algorithm FEAL," by A. Shimizu et al.; Papers of the Instistute of Electronics and Communications Engineers of Japan; vol. J70–D, No. 7; Jul. 1987; pp. 1413–1423. (In Japanese).

"Applies Cryptography," by Bruce Shcneier; John Wiley & Sons, New York, 1996; second edition; pp. 334–335.

"Secret Key Ciphers That Change the Encipherment Algorithm Under the Control of the Key", S. Miyaguchi, NTT Review, vol. 6, No. 4, Japan, Jul. 1994, pp. 85–90.

"Designing S–Boxes for Ciphers Resistant to Differential Cryptanalysis", C.M. Adams et al., Proc. of 3rd Symposium on the State of Progress of Research in Cryptography, Rome, Italy. Feb. 1993, pp. 181–190.

"Simple and Effective Key Scheduling for Symmetric Ciphers", C.M. Adams, Workshop Record of the Workshop on Selected Areas in Cryptography (SAC 94), May 5–6 1994, pp. 129–133.

"Designing DES–Like Ciphers with Guaranteed Resistance to Differential and Linear Attacks", C.M. Adams, Workshop Record of the Workshop on Selected Areas in Cryptography (SAC 95), May 18–19 1995, pp. 133–144.

"Differential Cryptanalysis of FEAL and N–Hash", E. Biham et al., Advances in Cryptology: Proc. of Eurocrypt '91, Springer–Verlag, 1992, pp. 1–16.

"Differential Cryptanalysis of Snefru, Khafre, REDOC–II, LOKI, and Lucifer", E. Biham et al., Advances in Cryptology: Proc. of CRYPTO '91, Springer–Verlag, 1992, pp. 156–171.

"A Proposal for a New Block Encryption Standard", X Lai et al., Advances in Cryptology: Proc. of EUROCRYPT '90, Springer–Verlag, 1991, pp. 389–404.

*Primary Examiner*—Bernarr e. Gregory
*Attorney, Agent, or Firm*—Markinson & Reckamp, P.C.

[57] ABSTRACT

A new design procedure for constructing a family of DES-like Substitution-Permutation Network (SPN) cryptosystems with desirable cryptographic properties including provable resistance to differential cryptanalysis, linear cryptanalysis, and related-key cryptanalysis is described. New cryptosystems called CAST ciphers, constructed according to the procedure, are also described. Details of the design choices in the procedure are given, including those regarding the component substitution boxes (s-boxes), the overall framework, the key schedule, and the round function. A fully specified example CAST cipher, an output of this design procedure, is presented as an aid to understanding the concepts and to encourage detailed analysis by the cryptologic community.

15 Claims, 2 Drawing Sheets

CONSTRUCTION SYMMETRIC CIPHERS USING THE CAST DESIGN PROCEDURE

FIELD OF THE INVENTION

The invention resides generally in symmetric cryptosystems and their construction procedures. In particular, it is directed to new ciphers which belong in a family of DES-like substitution-permutation network cryptosystems and to methods of cryptographically transforming plaintext into ciphertext using such novel ciphers. The invention relates also to procedures for constructing such new ciphers.

BACKGROUND OF THE INVENTION

This invention relates to a design procedure for a family of symmetric encryption algorithms. The ciphers produced, known as CAST ciphers, are provably resistant to differential cryptanalysis, linear cryptanalysis, and related-key cryptanalysis. Furthermore, they can be shown to posses a number of desirable cryptographic properties such as avalanche, Strict Avalanche Criterion (SAC), Bit Independence Criterion (BIC), and an absence of weak and semi-weak keys. CAST ciphers are based on the well-understood and extensively-analyzed framework of the Feistel cipher—the framework used in DES—but with a number of improvements (compared to DES) in both the round function and the key schedule which guarantee good cryptographic properties in fewer rounds than DES. These ciphers therefore have very good encryption/decryption performance (comparing very favourably with many alternatives of similar cryptographic strength) and can be designed with parameters which make them particularly suitable for software implementations on 32-bit machines.

Some aspects of the CAST design procedure were discussed in "*Designing S-Boxes for Ciphers Resistant to Differential Cryptanalysis*", C. M. Adams and S. E. Tavares, Proceedings of the 3rd Symposium on the State and Progress of Research in Cryptography, Rome, Italy, Feb. 1993, pp. 181–190; "*Simple and Effective Key Scheduling for Symmetric Ciphers*", C. M. Adams, the Workshop Record of the Workshop on Selected Areas in Cryptography (SAC 94), May 5–6 1994, pp.129–133; and "*Designing DES-Like Ciphers with Guaranteed Resistance to Differential and Linear Attacks*", C. M. Adams, the Workshop Record of the Workshop on Selected Areas in Cryptography (SAC 95), May 18–19 1995, pp.133–144. U.S. Pat. No. 5,511,123 (Adams), issued Apr. 23, 1996 also describes CAST cipher in more detail.

The search for a general-purpose design procedure for symmetric encryption algorithms is motivated by a number of factors, including the following:

(1) Despite years of speculation and warning regarding the inevitable limit to the useful lifetime of the Data Encryption Standard (DES), this algorithm remains firmly entrenched in a number of environments, partly because there is no obvious candidate for a DES replacement with acceptable speed and security.

(2) New and powerful cryptanalytic attacks have forced re-designs of suggested candidates such as FEAL in "*Differential Cryptanalysis of FEAL and N-Hash*", by E. Biham and A. Shamir, in Advances in Cryptology: Proc. of Eurocrypt '91, Springer-Verlag, 1992, pp.1–16; LOKI in "*Differential Cryptanalysis of Snefru, Khafre, REDOC-II, LOKI, and Lucifer*", by E. Biham and A. Shamir, Advances in Cryptology: Proc. of CRYPTO '91, Springer-Verlag, 1992, pp.156–171; and IDEA in "*A Proposal for a New Block Encryption Standard*", by X. Lai and J. L. Massey, Advances in Cryptology: Proc. of EUROCRYPT 90, Springer-Verlag, 1991, pp.389–404. Thus, such attacks must be accounted for and avoided in the design procedure itself, so that algorithms produced by the procedure are known to be immune to these attacks.

(3) The continued disparity between "domestic-strength" cryptography and "exportable-strength" cryptography, along with the potential for multiple flavours of exportable-strength cryptography (perhaps depending on "commercial escrow" considerations), means that the paradigm of a single DES replacement algorithm almost certainly has to be abandoned in favour of a design procedure describing a family of algorithms where keysize is at least one parameter defining a specific instance of the family. Recent cipher proposals such as RC-2, RC-4, and RC-5 have recognized and addressed this requirement.

The CAST design procedure to which the present invention relates is based upon a framework which has been extensively analysed by the cryptologic community for several decades. The CAST framework is the "Substitution-Permutation Network" (SPN) concept used in Feistel structure.

Figure 1:
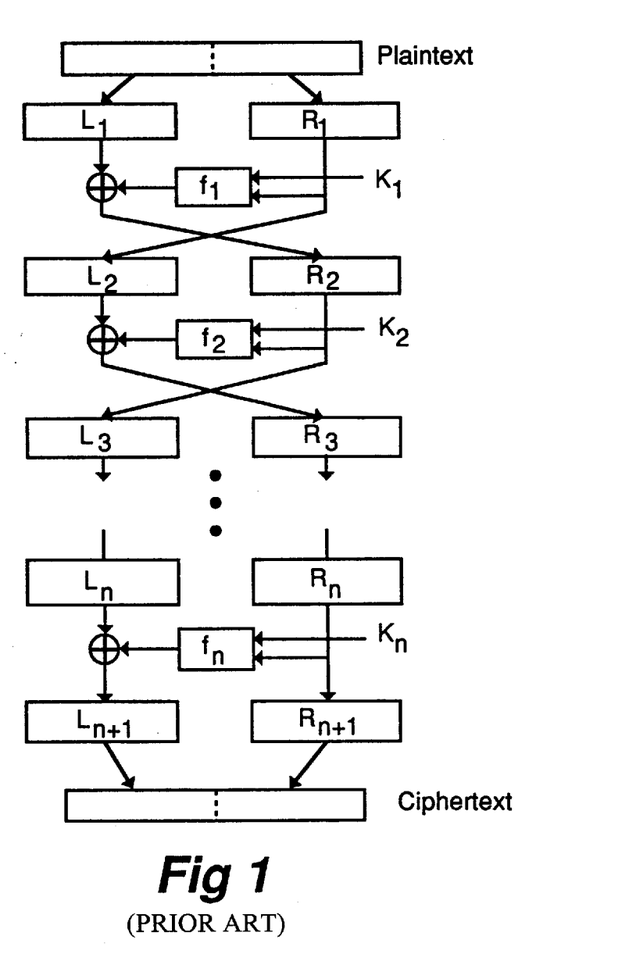
FIG. 1 is a known SPN (Substitution-Permutation Network) cipher.

FIG. 1 illustrates a general Feistel-structured SPN. Referring to the figure, basic operation is as follows. A message block of n bits is input and split into a left half L and a right half R. The right half and a subkey $K_i$ are input to a "round function", $f_1$, the output of which is used to modify (through XOR addition) the left half. Swapping the left and right halves completes round one. This process continues for as many rounds as are defined for the cipher. After the final round (which does not contain a swap in order to simplify implementation of the decryption process), the left and right halves are concatenated to form the ciphertext.

The parameters which can be selected for the framework are the blocksizes (the number of bits in both the plaintext and ciphertext data blocks) and the number of rounds. For all cases "higher" typically means greater security but (particularly for the number of rounds) reduced encryption/decryption speed. In practice, it is common to choose the plaintext and ciphertext blocksizes to be equal so that the encryption process results in no data expansion (an important consideration in many applications).

The round function contains substitution boxes (s-boxes). An m×n s-box is an (m×n) lookup table which substitutes, or replaces, the input of m bits with the output of n bits in a nonlinear way so that any change to the input vector results in a random-looking change to the output vector which is returned. The substitution layer in an SPN cipher is of critical importance to security since it is the primary source of nonlinearity in the algorithm. The dimensions m and n of an m×n s-box can be of any size; however, the larger the dimension m, the (exponentially) larger the lookup table. For this reason m is typically chosen to be less than 10. The CAST design procedure makes use of substitution boxes which have fewer input bits than output bits (e.g., 8×32); this is the opposite of DES and many other ciphers which use s-boxes with more input bits than output bits (e.g., 6×4).

The design of a good key schedule is a crucial aspect of cipher design. Keying in the CAST design procedure is done in the manner typical for Feistel networks. That is, an input key (a "primary key") is used to create a number of subkeys according to a specified key scheduling algorithm; the subkey for a given round is input to the round function for use in modifying the input data for that round.

The critical difference between the key schedule proposed in the CAST design procedure and other schedules described in the open literature is the dependence upon substitution boxes for the creation of the subkeys. Other key schedules (the one in DES, for example) typically use a complex bit-selection algorithm to select bits of the primary key for the subkey for round I. Any weaknesses in this bit selection algorithm can lead to simple cryptanalysis of the cipher, regardless of the number of rounds. The schedule proposed in CAST uses a very simple bit-selection algorithm and a set of "key schedule s-boxes" to create the subkey for each round. These s-boxes must possess specific properties to ensure cryptographically good key schedules. This aspect is described in detail in the above-mentioned U.S. Patent.

The round function in CAST, as stated above, makes use of s-boxes which have fewer input bits than output bits. This is accomplished as follows. Within the round function the input data half is modified by the subkey for that round and is split into several pieces. Each piece is input to a separate substitution box, the s-box outputs are combined, and the result is the output of the round function. Although each m×n s-box on its own necessarily causes data expansion (since m<n), using the set of s-boxes in this way results in no expansion of the message half, allowing the SPN to have input and output blocksizes which are equal.

The round function design must involve a specific measure to guard against differential and linear attacks. Differential and linear cryptanalysis appear to be fairly general-purpose attacks which may be applied to a variety of substitution-permutation network (DES-like) ciphers. Both methods work on the principle of finding high-probability attacks on a single round and then building up "characteristics" (sets of consecutive rounds which interact in useful ways). Characteristics which include a sufficient number of rounds can lead to cryptanalysis of the cipher. The probability of a characteristic is equal to the product of the probabilities of the included rounds. This "characteristic probability" determines the work factor of the attack. If the work factor of the attack is less than the work factor for exhaustive search of the key space, the cipher is theoretically broken.

From the above description it can be seen that adding rounds to a DES-like cipher can always be done to increase the work factor of a differential or linear attack, until the work factor surpasses that of exhaustive key search. This makes the cipher computationally resistant to these attacks. The disadvantage of this approach is that the encryption/decryption speed of the cipher is reduced, perhaps drastically, since each added round slows the cipher down by a factor of 1/N, where N is the number of rounds in the original cipher.

An alternate approach which has been pursued by a number of researchers is to decrease the attack probability of an individual round by improving the properties of the round s-boxes. This results in a lower characteristic probability for the same number of rounds and therefore has the potential to make the cipher resistant to these attacks without degrading throughput. However, there is always the possibility that for a given cipher the round probability cannot be made low enough to avoid the need to add rounds. Furthermore, there is always the possibility that for a given cipher the best characteristic has not yet been found (and when it is found, it will render the cipher breakable).

The design procedure of the invention uses neither of the above approaches. Instead, the invention applies a slight alteration to the typical DES-like round function which renders it "intrinsically immune" (as opposed to computationally immune) to differential and linear cryptanalysis. Such an alteration is generally applicable to all DES-like ciphers and may, in some ciphers, be added with little degradation in encryption/decryption speed.

OBJECTS OF THE INVENTION

It is therefore an object of the invention to provide a novel construction procedure for symmetric ciphers.

It is another object of the invention to provide novel symmetric ciphers which have one or more desirable properties such as resistance to differential cryptanalysis, linear cryptanalysis, and related-key cryptanalysis.

It is a further object of the invention to provide a method of cryptographically transforming plaintext into ciphertext using novel round functions.

SUMMARY OF THE INVENTION

Briefly stated, according to one aspect, the invention relates to a data encryption method of cryptographically transforming plaintext into ciphertext in data blocks of a predetermined bitlength comprising a plurality of consecutive transformation rounds of half of each data block. Each consecutive transformation round comprises steps of combining the half data block with a first masking key of predetermined length using a first binary operation to generate a first modified half data block and combining the first modified half data block with a second masking key of predetermined length using a second (different) binary operation to generate a second modified half data block. The method further includes steps of processing the second modified half data block by a plurality of (m×n) mutually different substitution boxes to generate a third modified half data block and XORing the third modified half data block with the remaining half of the data block to generate a transformed half data block of a transformation round.

DETAILED DESCRIPTION OF THE PREFERRED EMBODIMENTS OF THE INVENTION

As was stated previously, the primary parameter options in framework design are blocksize(s) and number of rounds. It is preferable in many applications if the plaintext and ciphertext blocksizes are equal (therefore hereafter referred to the blocksize of a cipher), but aside from the constraint that the blocksize be large enough to prevent an exhaustive compilation of plaintext/ciphertext pairs for a single key, the only real blocksize consideration is ease of implementation. On current machines, 64 bits (the blocksize of DES) is an attractive choice because left and right data halves and other variables fit nicely into 32-bit registers. However, in the future another choice may be attractive for other reasons.

The number of rounds in the framework appears to be a much more important and delicate decision. There need to be enough rounds to provide the desired level of security, but not so many that the cipher is unacceptably slow for its intended applications. In an SPN of the Feistel type it is clear that the left half of the input data is modified by the output of the round function in rounds 1, 3, 5, 7, and so on, and the right half is modified in rounds 2, 4, 6, 8, and so on. Thus, it is clear that for equal treatment of both halves the number of rounds must be even. However, it is less obvious how many rounds is "enough".

Differential and linear cryptanalysis, the two most powerful attacks currently known for DES-like ciphers, have helped to quantify this design parameter. It has long been known, for example, that DES with 5 or 6 rounds can be broken, but not until 1990, with the introduction of differential cryptanalysis, was it clear why 16 rounds were actually used in its design—fewer rounds could not withstand a differential attack. With subsequent improvements to the differential attack and with the introduction of linear cryptanalysis, it now appears that 18–20 rounds would be necessary for DES to be theoretically as strong as its keysize.

A prudent design guideline, therefore, is to select a number of rounds which has an acceptably high work factor for both differential and linear cryptanalysis and then either add a few more rounds or modify the round function to make these attacks even more difficult (in order to add a "safety margin"). The design procedure according to one embodiment chooses the second approach for both security and performance reasons.

Figure 2:
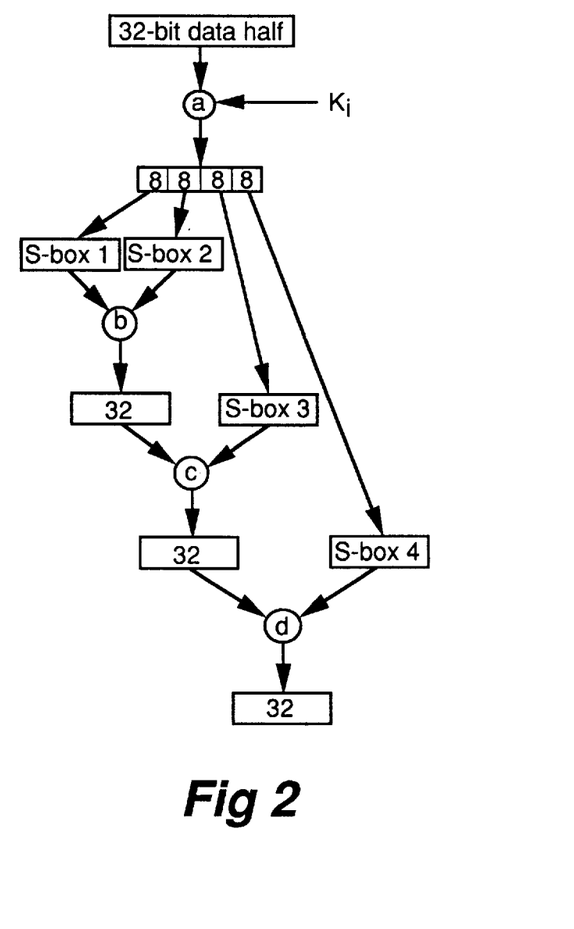
FIG. 2 shows a round function according to one embodiment of the invention.

FIG. 2 illustrates the round function according to one embodiment of the invention. This embodiment uses a 64-bit blocksize and 8×32 s-boxes. Referring to the figure, a 32-bit data half is input to the function along with a subkey $K_i$. These two quantities are combined using operation "a" and the 32-bit result is split into four 8-bit pieces. Each piece is input to a different 8×32 s-box ($S_1, \ldots, S_4$). S-boxes $S_1$ and $S_2$ are combined using operation "b"; the result is combined with $S_3$ using operation "c"; this second result is combined with $S_4$ using operation "d". The final 32-bit result is the output of the round function.

The round function according to one embodiment is to use XOR additions of 32-bit quantities for all operations (a, b, c, and d). Other, more complex, operations may be used for other embodiments as will be discussed later with respect to operation a.

S-boxes used in this embodiment are described in detail in the above-referenced U.S. Patent but a similar description will be given below for completeness. For the design of m×n (m<n) s-boxes, let n be an integer multiple of m; in particular, let n=rm where r>1 and r is chosen such that $m < \log_2 C(n, n/2) = \log_2$("n choose n/2"). Such s-boxes can be constructed as follows. Choose n distinct binary bent vectors $\phi_i$ of length $2^m$ such that linear combinations of these vectors sum (modulo 2) to highly nonlinear vectors. Furthermore, choose half the $\phi_i$ to be of weight $(2^{m-1} + 2^{(m/2)-1})$ and the other half to be of weight $(2^{m-1} - 2^{(m/2)-1})$; these are the two weights possible for binary bent vectors of length $2^m$. Set the n vectors $\phi_i$ to be the columns of the matrix M representing the s-box. Check that M has $2^m$ distinct rows and that the Hamming weight of each row and the Hamming distance between pairs of rows is close to n/2 (i.e., that the set of weights and the set of distances each have a mean of n/2 and some suitably small, but nonzero, variance). As well, if the $i^{th}$ row of M is denoted by $r_i$, it should be verified that $(r_i \oplus r_j) \neq (i \oplus j)$ for any $i, j \in \{1, \ldots, 2^m\}$, $i \neq j$ so that a non-zero input XOR is never equal to its resulting output XOR in the s-box (which may greatly facilitate finding a differential characteristic for the cipher). This latter condition will, in general, hold if the Hamming distance condition is met. If these conditions are not all satisfied, continue choosing suitable bent vectors (i.e., candidate $\phi_i$) and checking the resulting matrix until the conditions are satisfied. Note that it is not difficult to construct 8×32 s-boxes which meet these conditions. The Appendix found at the end of the disclosure gives a few sets of example s-boxes.

The key schedule used in the embodiment has three main components: a relatively simple bit-selection algorithm mapping primary key bits to "partial key" bits; one or more "key transformation" steps; and a set of "key schedule s-boxes" which are used to create subkeys from partial keys in each round. An example key schedule for an 8-round algorithm employing a 64-bit key is as follows.

Let KEY=$k_1 k_2 k_3 k_4 k_5 k_6 k_7 k_8$, where $k_i$ is the $i^{th}$ byte of the primary key. The partial keys $K'_i$ are selected from the primary key according to the following bit-selection algorithm: $K'_1 = k_1 k_2$, $K'_2 = k_3 k_4$, $K'_3 = k_5 k_6$, $K'_4 = k_7 k_8$, $K'_5 = k_4 k_3'$, $K'_6 = k_2 k_1'$, $K'_7 = k_8' k_7'$, $K'_8 = k_6' k_5'$, where KEY is transformed to KEY'=$k_1' k_2' k_3' k_4' k_5' k_6' k_7' k_8'$ between round 4 and round 5. The key transformation step is defined by:

$$k_1' k_2' k_3' k_4' = k_1 k_2 k_3 k_4 \oplus S_1[k_5] \oplus S_2[k_7];$$

$$k_5' k_6' k_7' k_8' = k_5 k_6 k_7 k_8 \oplus S_1[k_2'] \oplus S_2[k_4'].$$

The bytes of KEY' are used to construct the final four partial keys, as shown above. The set of partial keys is used to construct the subkeys $K_i$ using key schedule s-boxes $S_1$ and $S_2$:

$$K_i = S_1(K'_{i,1}) \oplus S_2(K'_{i,2})$$

where $K_{i,j}$ denotes the $j^{th}$ byte of $K_i$. Although a similar schedule can be constructed for a 12- or 16-round system or for different block or key sizes, for simplicity of notation and concreteness of explanation, the theorems below apply to the specific example given here.

As discussed previously, the number of rounds and the properties of the round function s-boxes can be chosen to guarantee computational immunity to differential and linear cryptanalysis. In a further embodiment, an extra work in the round function—specifically, some care in the choice of operation "a", is provided which can conceivably give intrinsic immunity to these attacks (in that these attacks can no longer be mounted).

The goal behind modifying the round function is to eliminate the possibility of both differential and linear cryptanalytic attacks against the cipher. This is done by inserting a nonlinear, key-dependent operation before the s-box lookup to effectively mask the inputs to the set of s-boxes. If these inputs are well "hidden", then s-box properties (such as the input XOR to output XOR mapping, or linearity) cannot be exploited in a general round function attack because the actual inputs to the s-boxes will not be known.

More specifically, according to one embodiment, the following modification to the round function f is provided:

$$f(R, K) = f(R, K_1, K_2) = S(a(R \oplus K_1, K_2))$$

where $a(\bullet, \bullet)$ is an operation with properties as defined below. For DES, the expansion operation can be placed either around R or $(R \oplus K_1)$—that is, $f(R, K) = S(a(E(R) \oplus K_1, K_2))$ or $f(R, K) = S(a(E(R \oplus K_1), K_2))$—depending on whether $K_1$ is 32 or 48 bits in length. As well, the permutation operation can be placed around $S(\bullet)$ as is done in the current round definition.

Several properties are required of the function $a(\bullet, \bullet)$. These will be discussed below, but they are enumerated here for reference.

(1) The subset sum operation must not be distributive over $a(\bullet, \bullet)$ (2) a(•, •) must represent a nonlinear mapping from its input to its output, so that any linear change in either input leads to a nonlinear change in the output vector.
(3) a(•, •) must be relatively simple to implement in software (in terms of code size and complexity).
(4) a(•, •) must execute efficiently (no more slowly than the remainder of the round function, for example).
(5) a(•, •) must effectively "hide" its R (or E(R)) input if $K_1$ and $K_2$ are unknown (in the sense that there must be no way to cancel the effect of the keys in the round function using an operation on a single R value or a pair of R values).

A function which appears to encompass all the properties listed above is modular multiplication, for an appropriate choice of modulus. If R, $K_1$, and $K_2$ are 32 bits in length, two candidate moduli are $(2^{32}-1)$ and $(2^{32}+1)$. A simple algorithm to carry out multiplication modulo $(2^{32}-1)$ in a high-level language using only 32-bit registers has been reported and multiplication with this modulus is shown to be a "complete" operation (in that every input bit has the potential to modify every output bit), so that this modulus appears to satisfy nonlinearity, simplicity, and data hiding. However, this modulus does not satisfy the fifth property ideally, since zero always maps to zero, and $(2^{32}-1)$ always maps to either $(2^{32}-1)$ or zero (depending on the implementation), regardless of the key in use. (Note, however, that in a practical implementation it is a simple matter to ensure that the computed subkey $K_2$ is never equal to 0 or to $(2^{32}-1)$, and masking R with $K_1$ ensures that it is not easy for the cryptanalyst to choose R such that $(R \oplus K_1)$ is equal to 0 or to $(2^{32}-1)$.)

The modulus $(2^{32}+1)$ may be a better choice with respect to property five than $(2^{32}-1)$ if either of two simple manipulations are performed. Firstly, each input can be incremented by one, so that the computation is actually done with $(R+1)$ and $(K+1)$. Thus the arguments belong to the set $[1, 2^{32}]$ rather than $[0, 2^{32}-1]$, avoiding both the zero and the $(2^{32}+1)$ "fixed point" inputs. Alternatively, the inputs can be left as is (so that the computation is done with R and K), with only the zero input mapped to the value $2^{32}$ (and the $2^{32}$ output mapped back to zero). Implementation of multiplication using this modulus is thus only slightly more difficult using a high-level language with 32-bit registers than for the modulus $(2^{32}-1)$, and on platforms where the assembly language instructions give access to the full 64-bit result of a 32-bit multiply operation, the modular reduction can be accomplished quite simply and efficiently. Furthermore, as for $(2^{32}-1)$, multiplication with this modulus represents a nonlinear mapping from input to output.

In order to ensure that the modular multiplication does not perform badly with respect to property five, it is necessary that the subkey $K_2$ be relatively prime to the modulus. Thus, when the subkeys are being generated, the $K_2$ used in each round must not have 3, 5, 17, 257, or 65537 as factors if the modulus $n=(2^{32}-1)$, and must not have 641 or 6700417 as factors if $n=(2^{32}+1)$.

Finally, it appears that either modulus can be used to satisfy property one, since the subset sum operation is not distributive over modular multiplication.

A CAST cipher implemented with a blocksize and keysize of 64 bits, four 8×32 s-boxes $S_1 \ldots S_4$ in the round function, and 32-bit subkeys in each round, has been shown to have a work factor for differential and linear attacks which is greater than exhaustive search of the key space if 12 or more rounds are used. If operations a, b, c, and d are all XOR addition, the round function f may be computed simply as:

$$f(R, K) = S_1(B^{(1)}) \oplus \ldots \oplus S_4(B^{(4)})$$

where $B = R \oplus K$ and $B^{(j)}$ is the $j^{th}$ byte of B. Application of the technique described in this section yields the modified computation of operation "a", where f remains identical but B is now computed as $$B = ((R \oplus K_1) * K_2) \bmod n.$$

Examination of the assembly language instructions required for the modular multiplication step alone (using either $(2^{32}-1)$ or $(2^{32}+1)$ as the modulus) shows that multiplication takes approximately the same amount of time as the remainder of the round on a Pentium-class PC, so that there is a performance impact of about a factor of two, compared with a version of CAST where operation "a" is simple XOR addition.

According to further embodiments of the invention, a number of options are available both for the round function operations and for the framework design which do not appear to compromise security and do not degrade encryption/decryption performance of the resulting cipher. In fact, for some choices it appears that security or performance may be enhanced, thus motivating the use of these alternatives in practice.

Thus far throughout the specification, the operations a, b, c, and d in the round function have been given as the eXclusive-OR of two binary quantities (i.e., addition modulo 2). It should be clear, however, that other binary operations may be used instead. Particularly attractive are addition and subtraction modulo $2^{32}$, since these operations take no more time than XOR and so will not degrade encryption/decryption performance in any way. Experimental evidence suggests that using such alternative operations may significantly increase security against linear cryptanalysis, but in any case appears to make both linear and differential characteristics more difficult to find.

As mentioned above, in one embodiment an extra computation (using extra key bits) is added to the operation "a" in the round function. The specific computation mentioned is multiplication with another 32-bit subkey using a modulus of either $(2^{32}-1)$ or $(2^{32}+1)$. However, it was noted that this addition can degrade performance by as much as a factor of two. An alternative is rotation (i.e., circular shifting) by a given number of bits. This operation is similar to the central operation of the cipher RC-5, except that this is a key-dependent rotate (controlled by a 5-bit subkey) rather than a data-dependent rotate, since data-dependent rotation may be less appropriate for a Feistel-type structure.

This extended "a" operation in a further embodiment with a 64-bit blocksize is then $$a(R, K) = a(R, K_1, K_2) = ((R \bullet K_1) <<< K_2),$$

where "•" is any binary operation (such as XOR or addition modulo $2^{32}$), "<<<" is the circular left shift operator, $K_1$ is a 32-bit subkey, and $K_2$ is a 5-bit subkey. The primary advantage of the rotation operation over modular multiplication is speed: on typical computing platforms an n-bit rotation $(0 \leq n \leq 31)$ can be accomplished in a small number of clock cycles, thus causing minor performance degradation in the overall cipher. Rotation satisfies property (1) mentioned above because it prevents a linear attack for all cases except the extreme case where the input subset considered consists of the full set of input bits. It is highly unlikely that this extreme case applied in every round of an N-round cipher will describe a successful linear characteristic for the cipher.

The discussion thus far mentioned that the binary operation in a, b, c, and d must be the same in all four instances (e.g., XOR). However, different binary operations can be employed. For example, it is perfectly acceptable for b and d to use addition modulo $2^{32}$ while c uses XOR (this is precisely the combination used in the Blowfish cipher). Certainly many variations are possible, and while it is not clear that any one variation is significantly better than any other, it does appear to be the case that the use of different operations within a, b, c, and d can add to the security of the overall cipher (note that the IDEA cipher has long advanced the conviction that operations over different groups contribute to cipher security).

Another design option is to vary the definition of the round function itself from round to round. Thus, in an N-round cipher there may be as many as N distinct rounds, or there may be a smaller number of distinct rounds with each type of round being used a certain number of times. The variations in the round definitions may be due to the kinds of options mentioned in the previous subsection or may be more complex in nature.

Whether the idea of a number of distinct rounds in a cipher adds in any significant way to its cryptographic security is an open question. However, it certainly appears to complicate the analysis of the cipher, which is sometimes effective in complicating the cryptanalysis of the cipher.

In order to facilitate detailed analysis of the CAST design procedure, and as an aid to understanding the procedure itself, an example CAST cipher is provided in this section with some examples given in the Appendix. This 12-round cipher has a blocksize of 64 bits and a keysize of 80 bits; it uses the rotation operation to provide intrinsic immunity to linear and differential attacks; it uses a mixture of XOR, addition and subtraction (modulo $2^{32}$) for the operations a, b, c, and d in the round function; and it uses three variations of the round function itself throughout the cipher. Finally, the 8×32 s-boxes used in the round function each have a minimum nonlinearity of 74 and a maximum entry of 2 in the difference distribution table.

This example cipher appears to have cryptographic strength in accordance with its keysize (80 bits) and has very good encryption/decryption performance: over 1 MByte/sec on a 486-DX2 66 MHz PC, and over 2.5 MBytes/sec on a 90 MHz Pentium.

Pairs of Round Keys

This instance of a CAST cipher uses a pair of subkeys per round; a 32-bit quantity $K_m$ is used as a "masking" key and a 5-bit quantity $K_r$ is used as a "rotation" key.

Non-Identical Rounds

Three different round functions are used in this example CAST cipher. The rounds are as follows (where "D" is the original input to the f function and "$I_a$"–"$I_d$" are the most significant byte through least significant byte of I, respectively). Note that "+" and "−" are addition and subtraction modulo $2^{32}$, "^" is bitwise XOR, and "<<<" is the circular left-shift operation.

Type 1: $I=((K_{mi}+D)<<<K_{ri})$ $f=((S1[I_a]\hat{}S2[I_b])-S3[I_c])+S4[I_d]$

Type 2: $I=((K_{mi}\hat{}D)<<<K_{ri})$ $f=((S1[I_a]-S2[I_b])+S3[I_c])\hat{}S4[I_d]$ Type 3: $I=((K_{mi}-D)<<<K_{ri})$ $f=((S1[I_a]+S2[I_b])\hat{}S3[I_c])-S4[I_d]$ Rounds 1, 4, 7, and 10 use f function Type 1.
Rounds 2, 5, 8, and 11 use f function Type 2.
Rounds 3, 6, 9, and 12 use f function Type 3.

Key Schedule

Let the primary 80-bit key be A=a1a2a3a4a5a6a7a8a9a0, where each $a_i$ is a byte.

Let $K_{m1}, \ldots, K_{m12}$ be twelve 32-bit masking subkeys (one per round).

Let $K_{r1}, ,K_{r12}$ be twelve 32-bit rotate subkeys (one per round); only the least significant 5 bits are used in each round. See the Appendix for a detailed description of how to generate $K_{mi}$ and $K_{ri}$ from A.

Substitution Boxes

This example CAST cipher uses eight substitution boxes: s-boxes S1, S2, S3, and S4 are round function s-boxes; S5, S6, S7, and S8 are key schedule s-boxes. See Appendix for the s-box contents. The CAST design procedure can be used to produce a family of encryption algorithms which are provably resistant to differential cryptanalysis, linear cryptanalysis, and related-key cryptanalysis. CAST ciphers also possess a number of other desirable cryptographic properties and have good encryption/decryption speed on common computing platforms. Analysis of the procedure described in this paper by members of the cryptologic community is strongly encouraged so as to increase confidence in the various aspects of the design presented.

APPENDIX

This appendix provides full details of the example CAST cipher given above.

Key Schedule

Let the primary 80-bit key be A = a1a2a3a4a5a6a7a8a9a0, where each $a_i$ is a byte.
Let $K_{m1}, \ldots, K_{m12}$ be twelve 32-bit masking subkeys (one per round).
Let $K_{r1}, , K_{r12}$ be twelve 32-bit rotate subkeys (one per round); only the least
significant 5 bits are used in each round.
Let b1 . . . b8, through g1 . . . g8 and bw, bx, by, bz through gw, gx, gy, gz be intermediate (temporary) bytes.
Let Si[] represent s-box i and let "^" represent XOR addition.
The subkeys are formed from the primary key as follows.
Masking Subkeys

```
b1b2b3b4 = a1a2a3a4 ^ S5[a6] ^ S6[a8] ^ S7[a5] ^ S8[a7] ^ S7[a9]
b5b6b7h8 = a5a6a7a8 ^ S5[b1] ^ S6[b3] ^ S7[b2] ^ S8[b4] ^ S8[a0]
bwbxbybz = b5b6b7b8 ^ S5[a9] ^ S6[a0] ^ S7[a9] ^ S8[a0]
Km1 = S5[b1] ^ S6[b2] ^ S7[b8] ^ S8[b7] ^ S5[bw]
Km2 = S5[b3] ^ S6[b4] ^ S7[b6] ^ S8[b5] ^ S6[bx]
Km3 = S5[b5] ^ S6[b6] ^ S7[b4] ^ S8[b3] ^ S7[by]
Km4 = S5[b7] ^ S6[b8] ^ S7[b2] ^ S8[b1] ^ S8[bz]
c1c2c3c4 = b1b2b3b4 ^ S5[b5] ^ S6[b7] ^ S7[b6] ^ S8[b8] ^ S7[bw]
c5c6c7c8 = b5b6b7b8 ^ S5[c2] ^ S6[c4] ^ S7[c1] ^ S8[c3] ^ S8[bx]
cwcxcycz = c5c6c7c8 ^ S5[bw] ^ S6[bx] ^ S7[by] ^ S8[bz]
Km5 = S5[c4] ^ S6[c3] ^ S7[c5] ^ S8[c6] ^ S5[cw]
Km6 = S5[c2] ^ S6[c1] ^ S7[c7] ^ S8[c8] ^ S6[cx]
Km7 = S5[c8] ^ S6[c7] ^ S7[c1] ^ S8[c2] ^ S7[cy]
```

APPENDIX-continued

```
Km8  = S5[c6] ^ S6[c5] ^ S7[c3] ^ S8[c4] ^ S8[cz]
d1d2d3d4 = c1c2c3c4 ^ S5[c5] ^ S6[c7] ^ S7[c6] ^ S8[c8] ^ S7[cw]
d5d6d7d8 = c5c6c7c8 ^ S5[d2] ^ S6[d4] ^ S7[d1] ^ S8[d3] ^ S8[cx]
dwdxdydz = d5d6d7d8 ^ S5[cw] ^ S6[cx] ^ S7[cy] ^ S8[cz]
Km9  = S5[d4] ^ S6[d3] ^ S7[d5] ^ S8[d6] ^ S5[dw]
Km10 = S5[d2] ^ S6[d1] ^ S7[d7] ^ S8[d8] ^ S6[dx]
Km11 = S5[d8] ^ S6[d7] ^ S7[d1] ^ S8[d2] ^ S7[dy]
Km12 = S5[d6] ^ S6[d5] ^ S7[d3] ^ S8[d4] ^ S8[dz]
```
Rotate Subkeys

```
e1e2e3e4 = d1d2d3d4 ^ S5[d6] ^ S6[d8] ^ S7[d5] ^ S8[d7] ^ S7[dw]
e5e6e7e8 = d5d6d7d8 ^ S5[e1] ^ S6[e3] ^ S7[e2] ^ S8[e4] ^ S8[dx]
ewexeyez = e5e6e7e8 ^ S5[dw] ^ S6[dx] ^ S7[dy] ^ S8[dz]
Kr1 = S5[e1] ^ S6[e2] ^ S7[e8] ^ S8[e7] ^ S5[ew]
Kr2 = S5[e3] ^ S6[e4] ^ S7[e6] ^ S8[e5] ^ S6[ex]
Kr3 = S5[e5] ^ S6[e6] ^ S7[e4] ^ S8[e3] ^ S7[ey]
Kr4 = S5[e7] ^ S6[e8] ^ S7[e2] ^ S8[e1] ^ S8[ez]
f1f2f3f4 = e1e2e3e4 ^ S5[e5] ^ S6[e7] ^ S7[e6] ^ S8[e8] ^ S7[ew]
f5f6f7f8 = e5e6e7e8 ^ S5[f2] ^ S6[f4] ^ S7[f1] ^ S8[f3] ^ S8[ex]
fwfxfyfz = f5f6f7f8 ^ S5[ew] ^ S6[ex] ^ S7[ey] ^ S8[ez]
Kr5 = S5[f4] ^ S6[f3] ^ S7[f5] ^ S8[f6] ^ S5[fw]
Kr6 = S5[f2] ^ S6[f1] ^ S7[f7] ^ S8[f8] ^ S6[fx]
Kr7 = S5[f8] ^ S6[f7] ^ S7[f1] ^ S8[f2] ^ S7[fy]
Kr8 = S5[f6] ^ S6[f5] ^ S7[f3] ^ S8[f4] ^ S8[fz]
g1g2g3g4 = f1f2f3f4 ^ S5[f5] ^ S6[f7] ^ S7[f6] ^ S8[f8] ^ S7[fw]
g5g6g7g8 = f5f6f7f8 ^ S5[g2] ^ S6[g4] ^ S7[g1] ^ S8[g3] ^ S8[fx]
gwgxgygz = g5g6g7g8 ^ S5[fw] ^ S6[fx] ^ S7[fy] ^ S8[fz]
Kr9  = S5[g4] ^ S6[g3] ^ S7[g5] ^ S8[g6] ^ S5[gw]
Kr10 = S5[g2] ^ S6[g1] ^ S7[g7] ^ S8[g8] ^ S6[gx]
Kr11 = S5[g8] ^ S6[g7] ^ S7[g1] ^ S8[g2] ^ S7[gy]
Kr12 = S5[g6] ^ S6[g5] ^ S7[g3] ^ S8[g4] ^ S8[gz]
```
Substitution Boxes This example CAST cipher uses eight substitution boxes: s-boxes S1, S2, S3, and S4 are round function s-boxes; S5, S6, S7, and S8 are key schedule s-boxes. The s-box contents are written in hexadecimal and are to be read left to right, top to bottom. Two example sets of s-boxes are given on the following pages.

S-Box S1 (Example 1)

```
c6b00b1e  d08d094d  959cb449  8d531db4  4be173c6  5768439b  128a2452  0f3ff37a  d13e2600  cd088c51
8e296754  9f7f55ff  5faef124  4ed3e8bd  08a43a43  1b77f7fb  c0a9ed79  7281c4b7  4b776caa  ff75ab5d
f91a4cf9  4a7a7a4d  71514583  cbd5d1d5  caa98800  7576516c  4150fdfb  fb37f9fa  f657b43f  4f3ff3ef
7c612b9d  cf7ffdfb  80ea38a2  68922405  da4fa8f7  3c8a46c1  d21cdbce  3194b822  8498a509  666378af
b05d8ac2  5264708c  e8dff3ba  07c9c831  e359af3f  0d6fabfc  b5a05a25  5977d3f8  890c5e39  84a28601
8b67ff16  80ac9028  88e79bf2  854511f5  8f7fb425  8b76c5ff  6bca5bc1  6bd93db0  679a19e8  627efbcb
6d5f6ad8  6abfdf50  66a6c4f9  6b7fb9f8  851ac1cd  539ee5ca  3fa7791e  ee4adaa3  b0da1081  64722b5c
0180ed45  dd7d3aa9  03286987  d66be246  bdc2aa87  6cc198bc  3c263a67  ec8925ba  83bed710  586d1abc
8ab38c7e  71898970  e87ca369  1d254b1e  0b7d85ba  f92f979a  6b618a40  986c1e92  c99ac587  3e1e14ab
a2aa30b8  586432ad  44497b78  bd6536bc  273fc5ca  dc6530bc  c3ee7b71  8b904102  005567f4  4f918356
f8abbe8d  b2ded2e5  36926a4e  7461b37c  c2f5ce45  8946951b  0b15be3d  443505f2  f14de078  bf3566fb
3fba3326  7a6d3cbf  c3b8b63e  e7bb4246  384d3281  12fe72eb  8b0c54b5  a640fe22  744f7db6  588f08b8
28471d46  00f0f3f7  d44154ff  f16f301c  6edd219b  48e51a03  9cf8aefe  b86574bf  8d06d47d  491bf432
a62a7926  64c7daf8  5a574491  9cfe7ee5  7b1cf91c  b6a92e10  78ac797c  bebeb314  559ffa1e  96cd88a4
a63a2e77  654535e1  8932c728  42e10a85  813f9826  8b1599e9  72e1a3d3  76e14e07  40a8918b  43eac70a
b2e5daf9  b2610e8a  131fd57e  16c20411  eae620a3  e2a12694  ddc56b61  d6a92685  2df394d0  26e96085
c97a6fc3  a104515b  ebd9278e  851c83ad  a3aeae9c  ca028754  8d0e7a7f  eff5a7e5  fbe9df9c  91d2c5e8
d149aec6  be79154a  9ac9b069  f6f97688  b4362776  d0e12e86  cabca364  1d36537e  20d17279  f93a7752
21510485  fcd5aeba  cccb2967  12c21880  305a0c9d  e86de2ec  de0c0486  0bea2485  d6c97583  03290a12
3734fb8c  e2e92486  c153e151  75f7e74a  f3ee4b8e  4821e210  ae93d829  101be9dd  97e9cff4  2b14183c
0545c904  ba2222fc  398bc832  8a8cba18  6a4d1acb  d8e00719  5dd7d584  ee04183d  c4da06de  d7e22bd1
0e1593ef  1b4e51bb  7d30a737  6f40d522  b72aeac5  ae273e32  bfd36706  a255be29  76e3121f  6e0d123c
00245bd9  1b0c1c29  c9528578  da0c523d  8581d3ef  2df9cba3  1e3c1772  b9f8b9c5  56e63420  f6b7126c
c0fb4ac7  620893c9  86be64e4  250fdf80  1d7c1cbe  b27a2776  572200d1  fb5c4470  c1d3b18a  6c043c3e
8ff7b49c  f1d068c6  9c044011  e4976a6e  3d45343d  402fbe92  28041f0b  5ec42a38  7c28b5e5  0cbbd354
6228b66e  170410ad  cab4c13f  be8c30be  d2956e74  ae0c163e
```
S-Box S2 (Example 1)

```
c2ad2c5e  194d87b3  82c127ce  56bb0629  688a0d7a  b726d1c2  21f3de43  f4cd6b22  88c5295c  5eba71a7
cb14e9b7  16b6d157  24dc2fa1  fa5958f5  6b72774c  bb2283d0  069d6a56  83fbdc6d  11c78559  9d32faea
16239af7  9f7254a5  0618cfa8  83d22ba1  508f6b36  de7acca9  447b55a7  c75ad1a1  41475489  cf33d385
57b890e7  d110d7a1  61152b5e  38882409  d9ac7bdd  88258fbd  2659d784  75568779  9616f2b3  c805baaa
01c014da  55670ac4  bfc6df20  e732d018  4ff1eb6d  1d72f223  fc6b158c  a7b3fe37  a4aaa246  549d7b56
6d3a1124  93107081  597c701a  aba2f99c  966ed435  6fa506d5  c805995f  3304b3b4  0739aba1  f662d3ee
3be6a0a9  ceb8822e  f732c5b5  0d3e5645  cb70db1c  40d450f7  b358b096  3ea2f1f9  a1479a2c  2fbb2e31
d8ee0991  55d05cf0  29d8fe9e  a777e6e6  53591efc  df2b260a  4d05f86b  c3c407a3  326fc08c  bbef3432
0e505514  12262b00  b99a5217  a4af05ab  c7faa510  d73f23c7  7e513060  6a4bb4e7  d1123474  cfe33bff
65e6eae9  7ed726c0  115a0beb  062e24e5  afa567b7  b88da0e3  684cdc1c  5911bb51  0035c48d  303c784f
4fd460d6  7dcb70aa  2f8b2d63  195ccd68  9059cb18  a4aad589  ff8b0863  ceaf2777  b66814a3  84efa545
```

APPENDIX-continued

| | | | | | | | | | |
|---|---|---|---|---|---|---|---|---|---|
| d5f6a24e | e73a09d5 | ace39d04 | fd40c427 | 3d67ee62 | 6a8d8fe2 | 78e56ff9 | 23ef86de | eea723ff | b678d983 |
| 891cce1d | da9d0cee | 1ea434e7 | 4fef24bd | 5bbbd7cf | 07a57d7e | cfaf32e7 | 94e76107 | 69f7a056 | 427b29bd |
| 69fd88cc | 4f858823 | 37e3a276 | 181c52ca | 38e1754b | 19d5e52a | 63fe8254 | 45d8ddad | 645e65b7 | 4d8c5f11 |
| 3da381a1 | 1541fcf9 | 3248f846 | 16610998 | affeed5e | 4c89506b | 5a9d2a5d | b6027ee0 | 695f19fb | 8430dead |
| 9d564aaa | 7cee8dad | 1bb5cf3e | f54445a5 | ef49d2a3 | 0c505deb | de54f681 | 340a5d8f | 2c811eed | c80859e9 |
| ca43a756 | c3b6870b | a292fcd7 | a11b01b5 | 6f505c8c | 6e4c0c71 | 0f2450b9 | 077b34a2 | caf7b6d2 | ce2eabc2 |
| a0ad7228 | ac085e5c | 60ee6869 | 66695e2f | 05529a84 | 0896747f | 0dc5254e | fbe7fa5c | 96629628 | 6820f489 |
| 1060d712 | e4c07b94 | 8d005835 | 72ffa0d9 | 33333457 | c81137b4 | ac2aodad | 5d685fa6 | 22952fa5 | d1820424 |
| bc084bbd | 4640d80d | 6fd5a8eb | 241d0106 | a79be06b | e863800c | 51d1cadf | 1f7e52c6 | 9e035d66 | d7372d07 |
| dd1caa69 | 93eab513 | 13ec6d03 | 5bee57b3 | eb85a994 | a3235c50 | 24aab079 | 69534185 | a8cc2de3 | 42ab58f9 |
| 3d3f02ec | d0607e5e | 9779d9e3 | 73825630 | 0ae04a9d | ea88ed14 | 65d76f83 | 8b224d0c | f12b9212 | 1a225575 |
| 51b6561c | b2e85510 | cb631642 | 2e6ad154 | cce5afeb | 7dd0e7ac | a4f4bc78 | 16fd09b8 | 39221421 | 892e045d |
| 59467096 | e9ddbc9f | 549196ef | e01c8b70 | 3f1f5a94 | 8a6a56cc | a6886858 | 100bf6b6 | c330d2b9 | 77e07c62 |
| 0a73e5f3 | 2dc5bad2 | 29c09691 | 0e42f415 | 8e06370e | a372fb29 | aa365000 | 84dd8070 | 9dd59cea | be777711 |
| ba486d14 | 9b1a570a | 1d37a73c | 3760048b | 3b6a4310 | 106610b0 | | | | |

S-Box S3 (Example 1)

| | | | | | | | | | |
|---|---|---|---|---|---|---|---|---|---|
| 86f5c342 | c231da03 | 64140aed | 129ec99e | 3ef407ec | 6fcb995f | e0382359 | b9ba0244 | 72524815 | 3a759e48 |
| b3491e6d | cb8e4b5e | e61bfda2 | 91ec2964 | 27dee3ca | 5a3ad1fe | 22bbbeco | 2dc09f7a | 0cdf5081 | 12ea514f |
| 99f9ae94 | 980a4411 | 8fc26e5a | a58ac137 | 47aa9b46 | 6b132788 | 60e5aa94 | 5fba6f72 | d95ebb20 | d14249b8 |
| fabb0177 | dbb2ef5b | 07e182db | 73c6cdd8 | 6777b8e8 | 0b91adb8 | f457a25b | 842d2285 | 8998d5b3 | dbd06aa2 |
| bd2bd4d0 | e438849d | de35b50b | 9d49e649 | 59a24077 | 2ec75a8e | 1b16c97d | 4cefb517 | a8560728 | 94c66e8e |
| 7c4d1ac9 | 7b1ad37a | dea5f3ad | fd1d191b | 13936002 | 311f4f3d | 232cfff2 | 1dafdb72 | de68f9bf | d9822476 |
| 4b18fe7b | 4098dc82 | 9382d372 | 9b986d5e | 02bc173a | 56211e7b | 208c9e97 | 465edfe6 | 7a2c93d6 | 2b8a9d67 |
| 44b125e3 | 3d7ad47c | 7352cced | 3ac4caa2 | 52908857 | 0b475f24 | 32837b58 | 553cafdc | 33dff722 | 5e034584 |
| a72d38b8 | d9a959d0 | 680684bb | 37738535 | d9286aae | b8d21069 | 2f5af870 | 7573554f | e6e30fbe | 8a4331f2 |
| 30343cae | 5f6bfb08 | 8dd72f98 | d51bdf40 | 5e6ac50d | 1f7b7b21 | a23856a3 | 265f49a0 | b3ffbcd2 | 1f517bc0 |
| 704f33a1 | c064a63d | 4d514109 | cf91bc9a | 5dbb5028 | e5801277 | 6ffc3171 | dd003233 | 8dfac44d | 2a9fdeb6 |
| af57cd95 | 18d7216d | 0c568150 | a126e824 | 48845eb3 | de83c700 | 1eb43557 | 9dcdcde3 | 534b6428 | f167db45 |
| 63f56b0a | fdf60f08 | 1ea97dc5 | 99d3700c | 5f516803 | c44948fa | 17130708 | 8f50f924 | 3e6c3e77 | b2fc2237 |
| 9c5fdeda | 2283b18f | 84fffbfa | 1f54c56f | 10617eea | 89a3d770 | 8b8bb8a0 | 021ae3ca | 0a40eb7b | b9931a68 |
| 1c520414 | a9e5d4d1 | 9f07974e | 20d709e8 | 9bf44ad1 | dd7b42dc | 8dad4acb6 | e3a3ad7d | e3f452a6 | a0011424 |
| ff8b9678 | 95a33d06 | 363747d2 | 589a529b | 1ae856a6 | 65b39345 | 61014390 | 21cbb10c | 42b2d541 | 23ab136d |
| b6ea7bef | 828935cc | 572cc4da | 7b8c55ad | 06985ecd | 3cb6de11 | f9810104 | eb49ba96 | 8d602160 | 9d55583b |
| 672c491c | 67d4367f | 232fb845 | 164aa69b | e38f95f9 | f6026905 | 188df738 | adffb308 | c4564efb | 4253af4c |
| 646c0f3f | cd12e98a | ab9a1124 | 01b6b60c | db232663 | 67240f45 | 24750c8c | a30b5941 | bb83p74f | 30952596 |
| 63cb2f44 | e381956c | 85da15f0 | 591319b0 | e738b55f | 09bc5808 | bfd8903f | 64ea3ea8 | cb1787af | 329cfeb7 |
| 3574c3a7 | fd5448df | 546682be | 86a5f1ed | 37357d11 | d2caad96 | 74f97c59 | 9b11626d | 219b3356 | 96ed7b89 |
| a7f28773 | 39c586f8 | dcda6943 | 7f26bfa3 | 60ecffad | faa55681 | 28812cd5 | 8635bb1e | b5c63f63 | 1a9df8c0 |
| ca7728d7 | 5a6dd80b | 599ceec4 | d89d78e8 | 2ccc5068 | e8ef4e4b | 3c5b3f1f | d0b37c2a | bd7f37c8 | 4700a556 |
| 82b76a41 | 40f79351 | 120f5a67 | e312312e | 291a3299 | d8621dfa | 8888c380 | 6deddd5c | a8316eee | 5dc50280 |
| 83728ebf | 67e0ca5d | 0f60f57e | d83544c9 | 9b82363a | 523dc28d | 14bdeaf1 | fe31dd8b | e4054d64 | 388224c0 |
| 5b4b7709 | 9ca5f2c4 | d0356ec8 | 0bbb4e11 | 58a504c1 | 88b6fee9 | | | | |

S-Box S4 (Example 1)

| | | | | | | | | | |
|---|---|---|---|---|---|---|---|---|---|
| 154b0bc2 | 9e92acd6 | e8d3562e | 607b3270 | e148e878 | 7f97f0d6 | 18af89ad | 8cb5df89 | 4a28e9c0 | cf75d66f |
| aab7d57a | 3cb2462b | b5503fbb | 3db35e39 | 558ba589 | c784e535 | f190ac77 | 278b7320 | ae647e1f | 7f8f5d12 |
| 6814f368 | bfea6e26 | 264d12e3 | fff7fe37 | 204229c2 | f8175a3f | 7eb95eff | b135beec | afbd2e64 | 6eb5fe17 |
| e4d0f00b | 3bb53e56 | 804a28e9 | e74801c9 | d535853d | a34026c6 | d16d31a0 | b20c9b68 | 9bd07dfc | e072d02f |
| 68cc31a2 | 016ccf1d | 3e970216 | 566919c6 | 2f8c62ff | 5af7fe3f | 622e2a72 | 1fbfde1d | 636e0fa0 | 49aa21c0 |
| d7bed210 | e88c49bb | e7f155bc | ddb50597 | 5931665e | 7f370e7e | 7559715c | 51f5bcb2 | dea5f68f | ffd6e11e |
| faa10c2c | d6355e1e | 5f76ff1c | 7f89fa91 | 9a14227a | 90de812a | d70faf92 | d7a79f88 | 1e94d1c1 | 0150192e |
| 4ef2a450 | 53eaf634 | 3df59079 | 20b8ff96 | 6563fcc6 | 6b7d7fd7 | a39e8607 | a36f7785 | f357c830 | e84bdc8d |
| 7fd485cf | 78579ad9 | c0b2d7a7 | c15b64ea | fe4b8a91 | e02f47de | 509bfb5e | 402b938b | a714903a | bf437783 |
| 016d7343 | 06614715 | 386b179d | 3169d7af | 9a860db2 | 846117ae | 0e960151 | f9042c75 | 3aebfca5 | 7c948b3a |
| b7b25818 | 44c3f6d0 | 250f0044 | df2dfdd6 | be90485b | 5ea962a4 | 314b2fae | c9ae207e | 00438b42 | ec2bd783 |
| 8c7a93ce | 7070e3e1 | eca92618 | 8676c879 | 996afbac | fe507047 | a8ad7c44 | ca78a82f | c765dfa6 | a0eb6786 |
| d38ed8e4 | a6a9154e | a179df37 | c08a18a3 | 947665d4 | e1e977a6 | e9a8d6a0 | 805dd72d | 67170782 | 29cc85b6 |
| fa09f946 | b685b898 | 17b2eeb9 | 4c437d1e | 8fd5a2ce | dae9d860 | 1ed6e781 | 59abd226 | 9841d998 | c86e604b |
| 648cb1d9 | 28695051 | e655a748 | b178e057 | 86e6a39f | b775dfe3 | 19b0f07f | 2c595352 | ff48fd0b | c9386946 |
| 77b99522 | 4929f4dd | 5416afa2 | 6e41505f | c86b543f | e3433b0d | 396d2205 | 1a6bf075 | b380786a | 8d631036 |
| f5942429 | 10160b29 | 87edaa55 | 75b6ae0e | 42953fc0 | a3d0b2a8 | 2c287f9e | d62ef34e | fbb23fe3 | 17ba4cd4 |
| 8c690a74 | 62bd1d86 | 5b50e4bc | ad2df05f | 31788532 | c943dff7 | 139a00c8 | 1954ae83 | 6068dc70 | 7b5245db |
| d5af537e | c96fa6ff | a847c89e | a9e9201c | 268df73c | 27ab3152 | 487ff8cf | 4da846df | e971086c | e0eb5074 |
| 88aedafc | 895fd079 | f7b7d1c5 | 587f57b5 | ba2aff05 | 1ea6ea9f | f79128ff | 4d7b6b19 | a67770cc | 1a490e22 |
| 36f461c7 | 89990420 | 686a0fdb | c05ea648 | 2dbdf79a | 894a8612 | 7f76350e | c1482610 | 175d75d8 | d756c9e5 |
| 8899a638 | 4d729555 | 76e87b0d | a902bf41 | fe908360 | 290a669e | 0cbfe9a5 | d6ea821c | 8840867c | 4be83d0b |
| 7144e403 | ba482632 | f2297a2c | 2d48c631 | 64b7f26e | b1a5d96a | c7cc2c12 | 159dfc0d | 5bb5a987 | 8ae020ef |
| ed08fdd9 | 368e2148 | 9211b9e5 | 57801e92 | 3c4ad833 | e285dbc1 | ab60f2fe | 640e261c | 00d3c371 | d9731df4 |
| 83a2d68f | 2977b8c5 | b1430a33 | 127183d8 | e50c8579 | 415df4b8 | c9ec8e99 | 69cab61b | bfa5b17b | 0f086751 |
| 885c2e88 | 2d0b409d | d8599e6b | 68c88633 | e18f0cbf | 4974023a | | | | |

S-Box S5 (Example 1)

| | | | | | | | | | |
|---|---|---|---|---|---|---|---|---|---|
| 2bb1ce76 | a24f25c4 | 831431d4 | 0303db1a | 08db19f4 | 8f32c2d9 | a9f21d00 | 35f432ef | 2cb25fbf | a02e5aad |
| 8d95f281 | 1aed8191 | 17176c34 | 915730db | b2ea75b1 | 3d48aae2 | 0f031db4 | d4ecade3 | cb717039 | 196a7209 |
| 91aa7df8 | 48d732bb | 52c7ea11 | 9048e28b | ef394063 | 347ee412 | 38cac74d | f874a625 | 69d5909e | b4cba299 |
| b46fa239 | 608ea099 | 3d73d51a | 98daade4 | e6088fb9 | 4e93582a | c82ceda5 | 7f8b52cf | 108ca1ee | b81f4457 |
| 1f973404 | b7cb9a2a | d20508da | 65667ee7 | f6d1e7c3 | 4848e71b | 35ce8218 | 866eaf6d | 06dd7926 | 3d86adbc |
| f14dce25 | c73906c9 | 12460656 | 3796dad3 | e89ea68f | d26793c2 | 23005bd9 | 1064a315 | d87a3298 | f43ca15c |

APPENDIX-continued

| | | | | | | | | | |
|---|---|---|---|---|---|---|---|---|---|
| 2b089b69 | 022c02d8 | d06caa1f | f46cad18 | 070810b0 | 18f2d342 | 3fa9ef55 | 3ebea5dc | 84626376 | 958f1c4d |
| b54fcb80 | b84dc829 | 470fa1fe | 5d9324a8 | 702cac04 | 64505b17 | deae3ae2 | c6eeeedd | fc530776 | e8f154e5 |
| 33bee3b2 | 59515b74 | c8cca6f9 | add78c8f | 0d178bd8 | 766aec3d | e87a1c51 | 9ef11c0d | 9e84b6f5 | f8c31e95 |
| 65779d4c | 1cc95ca2 | a36cc61d | d8725c1e | 5ad258fb | 3c375e9f | 04cea398 | 86675360 | efb1513a | 632ea6ec |
| 14959373 | 8732ac5b | ee31736e | 71a2be81 | e12eca01 | 7a766c2d | 1ab87e5d | 9fdb2461 | ef681d41 | 69f5991d |
| 1977dcdf | 83d3517a | 2f642f64 | 943b5329 | 07f418e7 | a384784f | fefbf4c2 | 4b2f2455 | d02354cf | 78da6d54 |
| 27b9ad0b | 8cd9d190 | 10c3409b | b481dbdb | f1b161be | 58915c5f | dcd17cdd | 78d1530e | 18e9ba0a | 579621f8 |
| b08d05ec | f0b35e46 | bb4bc9ec | fa6bf6d5 | 1a6a2918 | 46a56293 | 796a5b67 | 33b79e31 | dee4579d | 8bdcb08d |
| c08f9958 | 80860547 | 6332a4cd | 2e90ae7e | 3c735928 | c73ca9ef | 3ea05561 | cad32615 | 62323980 | 99460687 |
| 673faec9 | 81d9a697 | 38e9456f | c7aee50e | 2b9b66d5 | cba4a719 | 7c6d34a6 | 879aa685 | 65b7e261 | 9396a505 |
| 0a2b4122 | 4943a9d8 | 11d9fa81 | 5d6b5d76 | 3bb468e9 | 689a56c3 | 215491f6 | 6f0e543b | ae4f7098 | e452deb6 |
| a57c8cc6 | f0ff8ffb | 8141e7fb | df916287 | 86163764 | d5f6abe1 | 31adddfe | 2a16a9b0 | 20d4aa7d | 34c8d2d5 |
| e1d6177a | e44fdeef | ff26e657 | e7b697ce | f0d01e91 | e3b42209 | ef23b200 | e3a46060 | 3eb8ca05 | 3775b6c4 |
| 23b48e47 | 2734a894 | 2baf9b33 | d2d42881 | 73cf2492 | 92f1df7f | c80d4c91 | 3f29d7be | 99280067 | 74e367aa |
| ed285ad9 | 11f51fcb | bca2f6e7 | 4a7e95f4 | 16c93071 | e8c024be | 527429f5 | a4d6af86 | 1f3158d1 | 157ea087 |
| c2e27c5e | c191276c | e17030bf | f80427fe | 227da776 | 309fa7ee | d6ab4c06 | d4ece076 | 09d9c32b | 10e6a261 |
| 292b9dda | 34dca7fd | f4f5e75c | f0d0a4fc | 2c69c85f | 4801a8a3 | 279fdbfd | 4f295c4f | 78f2e9c0 | 0fdc57a8 |
| 6016bc89 | 194c5112 | 4f097162 | 3610d74e | 523e05be | 35bd2a82 | 0707e286 | 61d3e37e | 1550965c | 6fb4aa09 |
| 07eb7443 | fc54a8da | 69928340 | 8f8a53ac | 72941a11 | 8709df96 | 1864ebe8 | f2f496a7 | 8b9617bc | 60f6af73 |
| f8653ffc | 1ce6e518 | fbfecf2d | 123717bc | 90f6a77a | 7476a97d | | | | |

S-Box S6 (Example 1)

| | | | | | | | | | |
|---|---|---|---|---|---|---|---|---|---|
| 4301e0aa | 934959bd | 08a01c00 | 55804207 | 8d3d33d7 | dd6e22b0 | c1361255 | 156ebfea | 07add6f6 | d0ceabd1 |
| 4a49a184 | 93ca9f6b | 4598280b | 9f02c8c4 | 02c707a1 | dfdeff6e | c8c70ddf | 993a8ed4 | 58f14a38 | 87757d83 |
| 48e24911 | 13cdc99a | d75bd08e | 0b6ebf7d | f5421b0d | ac26f7fe | 6a7ac372 | beef3fe9 | 71beed43 | afea37a8 |
| ec186eb4 | b6deffff | 47822eaa | 31310013 | 21976592 | df3bc04b | e3d39772 | 1811450b | 8440fd32 | fefeffe3 |
| 7bcd8915 | 8c05aa0c | 142e1875 | e87114d4 | 509514bd | a7cefefc | 33e12155 | c64ebf64 | 4e7cb3ef | 2b4934fa |
| ee0dbfea | 0036e03f | be0c8274 | dc815251 | 17deac59 | f73eff74 | d4da34de | 3f2615a3 | 7416f6c3 | 176caba6 |
| 2373be35 | 42d5fde0 | 870ddbf0 | 674ebff5 | d09f1a57 | d0d1f563 | eb3170f8 | 6318aefc | 4babcf28 | ce7e1c5c |
| 722afc8f | 76f68313 | 60397e0e | 635fd70a | 5cd4dd79 | 545233a5 | 7201c8d9 | 7d96b60d | 415f6746 | 4c46c392 |
| 5b58e52a | caa2600a | fa6cfef8 | e4e4d148 | ae797fce | 30d12f76 | 04c2e474 | 1c768384 | 76d667ed | 6fb6cb05 |
| dce2b387 | 4977c317 | 83a211a1 | 1cfa8341 | 2f851043 | 3546c303 | d4101457 | 42a13cfd | a20b414a | bdab3cb0 |
| 65c4b968d | 7f81fbf7 | 175c49e8 | 8d66c31a | 5c55e1ed | 4f9c46e7 | 22be2ca8 | 3be1a81a | 678d266f | 71da0025 |
| 10791bb2 | 05d68398 | ddef9b1a | 38d94a14 | 7c9d430a | 17af5cf4 | 481666ab | ab1d34ad | e447c2a3 | 8026c38d |
| 3742883e | dcbeb968 | 9283ce16 | f4fc4758 | a1ee90d7 | c545c919 | 0490ff07 | e4d68309 | c588a876 | c7d42384 |
| d60de7da | 5e2d3958 | e6b4788e | e303cbfc | ff7f6a6a | 79e354b0 | 35748d28 | be03402a | a9f04a1c | a977e506 |
| 170553f0 | 10cb00ea | 843afdec | 01531436 | 465e57c3 | 3dc7f6ed | 8d382192 | f9a8072c | f32fa0e8 | 8fc4b096 |
| 3b961b11 | 41235427 | 33cbf143 | 48bb3ca5 | 739729aa | 866254b4 | 86a78788 | 71f75da6 | c0d1a6a9 | b05314a7 |
| 491fc7b6 | b5aceb5a | 772e9e28 | 0286ab54 | 18ca6fab | e2ac2d17 | 2859974d | 527314b9 | 1110720b | 62c8d0c7 |
| af93f2cd | 54dc7ef9 | 4288ddc6 | bcd7b7c2 | f75cc818 | 88c3543c | c8f14833 | 6fb4ddf3 | 13d0d460 | b8fb8ad0 |
| 0551d80d | a458aa4d | d94375c6 | 7d73142e | 6a577e50 | cbbb4f88 | 35ff1d7b | 19f1d0bb | a4ea667e | 881816be |
| f98400ad | 51c354ad | d9e9ad73 | dbb370a2 | 8a6374da | 074a2a5b | efdd7b89 | efec0ae8 | b39c7b48 | 358497b1 |
| 9d1fda28 | 126dc309 | 4092cc919 | 4110b630 | af634cda | ada081db | 785d62f3 | fd34d732 | 5a3e40ce | 71a0e7cb |
| d05a6aaa | f5c6541f | ba4b69cf | 9327a982 | 37f0d013 | 19c49726 | 0fa0725b | a4d4ffa6 | 0af0a6a7 | 2e0557b2 |
| eb448492 | cd1816b7 | ecb327a6 | 4c34d7a3 | 557202b3 | c9c3284c | 2b4d4508 | 3fe9a857 | 1122beac | 8ac36c13 |
| 64badc6f | 7e14d7b8 | 9977e50b | 8eaec3d4 | 66fc39e8 | f8b33dcf | da6f10ec | 453cb6e3 | 2b3b0d07 | 34a49738 |
| d49d9f3e | 33db5ce5 | 1ebfd778 | f09dc9e3 | 1cb4c32a | fc3b3349 | d525e4c4 | 3594d72f | 56303d48 | 37dc1cbb |
| 1c95da56 | f59ec3bd | 9988b764 | 7077ddbf | d5e6dba2 | bda497a9 | | | | |

S-Box S7 (Example 1)

| | | | | | | | | | |
|---|---|---|---|---|---|---|---|---|---|
| 813c06d4 | 67033b80 | 88a17185 | 7d7ba354 | ace95364 | 5aa2776a | a4139684 | 57e084fb | 15408c02 | fa6ec746 |
| 1907265c | ed2fc499 | 2ca939fb | d53d3805 | 3b31ffd0 | cffe8e5b | 3267bfc2 | ae1182e9 | 417891eb | ca159f43 |
| 6ae64885 | e5bfdd34 | 1341a399 | 9d5edc5f | 3cbe068c | ba7a97df | 5ee36a2a | c7df8efe | 7c02fdf2 | ef2797db |
| 0e5f8aa5 | 94df4cff | 9f97093b | c080ec10 | f05c3a86 | b3237184 | b8512108 | ffd49029 | d64f2f23 | 9bffe9df |
| dd7e41ad | 81a568ba | b3618fff | fb314ec5 | e37cee5b | a1fbc0a6 | 960ec35b | d65fdc7f | 3ecb36db | 4e29aa7b |
| ffb9a411 | 97cd4a9e | e9a64412 | 828d3d78 | 22de9cca | 473e4e7b | 3978b2d5 | 59f53821 | ed464270 | 9dbefcaf |
| fbd0aba9 | 865a9777 | 3f5ccfda | 44fe1edb | 17cfb151 | 77f08429 | 2ed64a2c | 4f585cfd | 569aece9 | 39908cc7 |
| 7ef5a109 | 1587f376 | 86a3778f | edddb0c7 | bf3095bd | d94d331c | db4e4672 | a3cf4f88 | e946885d | 990df1d6 |
| b7d18843 | a263b560 | 910be66e | 98e6e0e6 | 2495f708 | 34dc2ab1 | 0b2d2438 | 4b997905 | 558cac5a | |
| 7d145da7 | 73ecf173 | de31067f | d915a85e | f0acf520 | e2ac3372 | 02b47abe | da7213bd | 666b4d27 | a500ce2d |
| b2325e85 | 7ce76380 | c92918a6 | 1998de52 | 214d3e20 | f4171f3f | 41163076 | 8353b940 | 808b11d2 | 5f08ff2f |
| e5f9f4de | 28aca3f2 | b0adc55a | c85addf6 | df8a9f9c | a13e753b | 57c53b9f | 33efc2f9 | 34adeb63 | 530df1f6 |
| c18f495c | b40203a0 | baf179f5 | c58d8322 | 2df3d024 | 5869e0f6 | 402ff057 | 3a8d6156 | 8ac190b3 | 2ad4aca3 |
| 335a67536 | e9c45475 | 8316c491 | 241d83dd | 2be081b1 | 8831d04e | 3b9f5bb5 | 90f1b0f5 | 82b4b3ff | 24d8332c |
| 26526c4a | 9eea4d32 | 94c28ae5 | 2409d9ee | 2af4a963 | 77c6b548 | ac8fe4dc | e5caca77 | 3111dfb1 | 69400a03 |
| bdbef538 | f4e90bea | 760d503d | 20a980ea | e0105fcd | ae6ad95a | 63972846 | 2498806c | e588fcc0 | bf281b4a |
| 97087e4c | 8f771b35 | 5be76c24 | 58bee6a5 | 07ae55fc | 016b6618 | dcbc3896 | c42efd6a | 34cb170a | 29123f0f |
| fc923a4d | f6c49970 | bd8f38eb | aa24f717 | 78fdd6ee | 7da88bca | 253ac16a | 15defddc | 820e9137 | bc107faa |
| 42513027 | 6e72e8c9 | e921caeb | ce89d9ce | b4a16574 | 810e0f12 | 07f55786 | 30098b0b | d04dfd1c | ededc246 |
| 758bd93f | 4f09496e | 03cdd8c9 | a5d8ecf5 | cad2a360 | 7f385423 | 669a84e3 | d8d0878f | aef949c3 | 15a9583c |
| 77835fc7 | d8bd388b | bb7cff81 | 0f453b56 | 0e4aec3c | b7e7c540 | d94a0297 | 6d05599c | b0bd611d | 644b7d3e |
| a3036ca6 | 68c64a2d | 409d9fc3 | 87dc0279 | 51b27d66 | 9f250b98 | 7ed5d04b | b0a04490 | 7c1897bf | a5a65928 |
| 9e5b2c34 | 4d554016 | 84847cba | 56a49b38 | 15d4f236 | aa7a1b67 | 922fe47a | 3162a6f3 | d232d58e | 7da76a4e |
| 5c25f0ec | f9b63518 | 77079778 | c35fb775 | f11a7a3b | 5159910a | a187d89d | 0b283761 | 34f51e94 | 9ca40bb8 |
| b4a3cd14 | 2c5275ae | 7dc25545 | f51cbff0 | 03cdb055 | 80efe8b7 | c0ad42bd | 454599bc | 53a96102 | d306cb6c |
| 8fbd93fc | 17c50b79 | f991796e | 6c214a38 | 3507194d | ae85c91c | | | | |

APPENDIX-continued

S-Box S8 (Example 1)

| | | | | | | | | |
|---|---|---|---|---|---|---|---|---|
| 03755908 | 8130788b | 60b34458 | f5a713fb | 1b3e6039 | 84ce8770 | 62da564e | fad6beb4 | 10e90337 | 8e7bb301 |
| 687c5e1a | e4c286dd | 0470b043 | 9d7f8fed | 672370b0 | fcad5e7c | 8a7833e0 | 19203447 | 1600c2a6 | 9ffb87ac |
| adf01f95 | 3cc7c2ec | 2e36e31e | b50f0559 | f527ecc1 | 62dc821e | 7ccafc4b | f4efcee8 | cbf3b9bf | 444f44ec |
| 5c441201 | dc8cabd | 0f01e193 | 0e403103 | 933c20ef | 976db906 | 5aaf1212 | 5ad1188c | d9d9f5b3 | cc1acfc7 |
| 1fe6961f | 0b562563 | 85e12831 | 913ccce5 | 5748c7ed | 58efe7cd | d3e0e9e7 | ce87fe7fc | 8dbab47f | cbd07112 |
| 6a4796f4 | 24cf2e6d | a427ad45 | fca8ae32 | 590d8ff9 | 19cd88e9 | 319e46ed | 7a7118a1 | de9fba85 | 98ef87ec |
| 108d0eea | 5fafdfee | e4bf444c | b6af8ffe | bb0c22ed | 1d4c4774 | 5ac87aad | efdb2d0c | 8f401cc4 | 24b4b09f |
| 78a42da1 | dceac743 | 6c9138da | d20381f6 | 940561ff | 20babd2a | 4a0acbbc | e703b51a | a71c4a55 | 1cd1258b |
| 34054217 | 015c03b0 | 0a7afc51 | 2583f85b | 398b2362 | 04b9fd09 | 16489fe9 | 2d3370ae | 215e953c | 0aa4b0e9 |
| 04b7c0a6 | 2c93f71f | 318dc948 | 0c337d19 | 067a2ff6 | 24f3fd4a | bb7d9a64 | fa3c0afc | b9451c02 | ed1585f1 |
| 22d62be7 | 60ab6163 | 23a7c95c | 6822fe32 | cd9ba7e0 | 9f2e1b94 | cb9a17cc | 9540f512 | 5735f71a | 18939f3a |
| 51df9202 | 0effd009 | 3fc2c59a | 1bac42e5 | a63faa1b | 9eb3539a | fc5bd4ba | ded6dfd7 | 6173b40e | 43f5b51c |
| ebe23502 | da092656 | 74e08670 | 4097bc1b | 24f43515 | 0dd3a41b | bc6138bb | 8cd3f40b | 9cd38f74 | 7a168aab |
| ff37b654 | 0aa1e1d3 | e80a8279 | 13e26d24 | 9dfe103e | 69b058bc | 2be77547 | d55d5d4d | 53da9c66 | b76470b5 |
| 5f445603 | a2d95981 | 30e706cc | cb8b3810 | 117edd8c | a686ce6f | 4d2430aa | e0dd7580 | fec46dbd | 43eb90d0 |
| b1122152 | 0ac97f71 | c6998ae1 | 7d7a7c56 | 837c0e7f | 2bc93880 | 34d7e7b3 | 9be93280 | 6330d06d | c3ad3091 |
| 9c2727fb | 7d66c767 | 4c3af29b | a84b4b2e | 05b9f47e | e5fd7edc | c6fd8783 | 3f7ca18f | 6868f83b | 9870c76b |
| bec5ca71 | 42ba3a89 | e05e29c5 | 0f49b1a1 | 2424af9b | dba10dd0 | 1a3c4a03 | 7c768f7e | 31e14484 | 5bc9dc41 |
| db31db45 | ab84700a | e62979f1 | 860b7a81 | aea0389d | cdd7eaad | 81ab6889 | e7e97180 | 638b588a | 08092982 |
| 5bcbb624 | 2989f992 | 3b550b6e | f9954aab | 3ab3775e | ef2220db | 838b017b | 4c67a534 | 987f942e | 5073deb4 |
| 2860b155 | f6da9045 | 305c5c7c | ece3b4bd | 8ec1d203 | 475a9c89 | 8f27c3d6 | 5408bc18 | b0fc5384 | 41050667 |
| 2ea1f1a2 | c55af588 | 5540aeb5 | a46a50ca | d693a25a | 2d0af579 | cd1f0ce3 | 2afdb15e | 44fecd6d | ac4afe88 |
| 315668bb | cc6af48a | a6f11265 | 442af899 | 37a4a3f3 | 76e50367 | 59bc3189 | 0dcc8826 | 623f3274 | 2078f8cc |
| 037c4493 | 44bb6f85 | c5ea363b | 93f70663 | af410a73 | f939fc81 | 9fdce6cd | d0ca36a9 | f9e42b81 | a626c5da |
| b7bbc419 | b3f54376 | 42668794 | 5e4a5e49 | 5cb25d45 | 5605fe10 | a1a8bdf9 | a3ccb88b | ab23b48d | b2502ba5 |
| 542bab83 | 406eb588 | 480d9c8a | 458aad88 | bc0a352c | ac0a7d98 | | | | |

S-Box S1 (Example 2)

| | | | | | | | | |
|---|---|---|---|---|---|---|---|---|
| 30fb40d4 | 9fa0ff0b | 6beccd2f | 3f258c7a | 1e213f2f | 9c004dd3 | 6003e540 | cf9fc949 | bfd4af27 | 88bbbdb5 |
| e2034090 | 98d09675 | 6e63a0e0 | 15c361d2 | c2e7661d | 22d4ff8e | 28683b6f | c07fd059 | ff2379c8 | 775f50e2 |
| 43c340d3 | df2f8656 | 887ca41a | a2d2bd2d | a1c9e0dE | 346c4819 | 61b76d87 | 22540f2f | 2abe32e1 | aa54166b |
| 22568e3a | a2d341d0 | 66db40c8 | a784392f | 004dff2f | 2db9d2de | 97943fac | 4a97c1d8 | 527644b7 | b5f437a7 |
| b82cbaef | d751d159 | 6ff7f0ed | 5a097a1f | 827b68d0 | 90ecf52e | 22b0c054 | bc8e5935 | 4b6d2f7f | 50bb64a2 |
| d2664910 | bee5812d | b7332290 | e93b159f | b48ee411 | 4bff345d | ad31973f | c4f6d02e | 55fc8165 | |
| d5b1caad | a1ac2dae | a2d4b76d | c19b0c50 | 882240f2 | 0c6e4f38 | a4e4bfd7 | 4f5ba272 | 564c1d2f | c59c5319 |
| b949e354 | b04669fe | b1b6ab8a | c71358dd | 6385c545 | 110f935d | 57538ad5 | 6a390493 | e63d37e0 | 2a54f6b3 |
| 3a787d5f | 6276a0b5 | 19a6fcdf | 7a42206a | 29f9d4d5 | f61b1891 | bb72275e | aa508167 | 38901091 | c6b505eb |
| 84c7cb8c | 2ad75a0f | 874a1427 | a2d1936b | 2ad286af | aa5Ed291 | d7894360 | 425c750d | 93b39e26 | 187184c9 |
| 6c00b32d | 73e2bb14 | a0bebc3c | 54623779 | 64459eab | 3f328b82 | 7718cf82 | 59a2cea6 | 04ee002e | 89fe78e6 |
| 3fab0950 | 325ff6c2 | 81383f05 | 6963c5c8 | 76cb5ad6 | d49974c9 | ca180dcf | 380782d5 | c7fa5cf6 | 8ac31511 |
| 35e79e13 | 47da91d0 | f40f9086 | a7e2419e | 31366241 | 051ef495 | aa573b04 | 4a805d8d | 548300d0 | 00322a3c |
| bf64cddf | ba57aE8e | 75c6372b | 50afd341 | a7c13275 | 915a0bf5 | 6b54bfab | 2b0b1426 | ab4cc9d7 | 449ccd82 |
| f7fbf265 | ab85c5f3 | 1b55db94 | aad4e324 | cfa4d3f7 | 2deaa3e2 | 9e204d02 | c8bd25ac | eadf55b3 | d5bd9e98 |
| e31231b2 | 2ad5ad6c | 954329de | adbe4528 | d8710f69 | aa51c90f | aa786bf6 | 22513f1e | aa51a79b | 2ad344cc |
| 7b5a41f0 | d37cfbad | 1b069505 | 41ece491 | b4c332e6 | 032268d4 | c9600acc | ce387e6d | bf6bb16c | 6a70fb78 |
| 0d03d9c9 | d4df39de | e01063da | 4736f464 | 5ad328d8 | b347cc96 | 75bb0fc3 | 98511bfb | 4ffbcc35 | b58bcf6a |
| e11f0abc | bfc5fe4a | a70aec10 | ac39570a | 3f04442f | 6188b153 | e0397a2e | 5727cb79 | 9ceb418f | 1cacd68d |
| 2ad37c96 | 0175cb9d | c69df09 | c75b65f0 | d9db40d8 | ec0e7779 | 4744ead4 | b11c3274 | dd24cb9e | 7e1c54bd |
| f01144f9 | d2240eb1 | 9675b3fd | a3ac3755 | d47c27af | 51c85f4d | 56907596 | a5bb15e6 | 580304f0 | ca042cf1 |
| 011a37ea | 8dbfaadb | 35ba3e4a | 3526ffa0 | c37b4d09 | bc30Eed9 | 98a52666 | 5648f725 | ff5e569d | 0cedE3d0 |
| 7c63b2cf | 700b45e1 | d5ea50f1 | 85a92872 | af1fbda7 | d4234870 | a7870bf3 | 2d3b4d79 | 42e04198 | 0cd0ede7 |
| 26470db8 | f881814c | 474d6ad7 | 7c0c5e5c | d1231959 | 381b7298 | f5d2f4db | ab838653 | 6e2f1e23 | 83719c9e |
| bd91e046 | 9a56456e | dc39200c | 20c8c571 | 962bda1c | e1e696ff | b141ab08 | 7cca89b9 | 1a69e783 | 02cc4843 |
| a2f7c579 | 429ef47d | 427b169c | 5ac9f049 | dd8f0f00 | 5c8165bf | | | | |

S-Box S2 (Example 2)

| | | | | | | | | |
|---|---|---|---|---|---|---|---|---|
| 1f201094 | ef0ba75b | 69e3cf7e | 393f4380 | fe61cf7a | eec5207a | 55889c94 | 72fc0651 | ada7ef79 | 4e1d7235 |
| d55a63ce | de0436ba | 99c430ef | 5f0c0794 | 18dcdb7d | a1d6eff3 | a0b52f7b | 59e83605 | ee15b094 | e9ffd909 |
| dc440086 | ef944459 | ba83ccb3 | e0c3cdfb | d1da4181 | 3b092ab1 | f997f1c1 | a5e6cf7b | 01420ddb | e4e7ef5b |
| 25a1ff41 | e180f806 | 1fc41080 | 179bee7a | d37ac6a9 | fe5830a4 | 98de8b7f | 77e83f4e | 79929269 | 24fa9f7b |
| e113c85b | acc40083 | d7503525 | f7ea615f | 62143154 | 0d554b63 | 5d681121 | c866c359 | 3d63cf73 | cee234c0 |
| d4d87e87 | 5c672b21 | 071f6181 | 39f7627f | 361e3084 | e4eb573b | 602f64a4 | d63acd9c | 1bbc4635 | 9e81032d |
| 2701f50c | 99847ab4 | a0e3df79 | ba6cf38c | 10843094 | 2537a95e | f46f6ffe | a1ff3b1f | 208cfb6a | 8f458c74 |
| d9e0a227 | 4ec73a34 | fc884f69 | 3e4de8df | ef0e0088 | 3559648d | 8a45388c | 1d804366 | 721d9bfd | a58684bb |
| e8256333 | 844e8212 | 128d8098 | fed33fb4 | ce280ae1 | 27e19ba5 | d5a6c252 | e49754bd | c5d655dd | eb667064 |
| 77840b4d | a1b6a801 | 84db26a9 | e0b56714 | 21f043b7 | e5d05860 | 54f03084 | 066ff472 | a31aa153 | dadc4755 |
| b5625dbf | 68561be6 | 83ca6b94 | 2d6ed23b | eccf01db | a6d3d0ba | b6803d5c | af77a709 | 33b4a34c | 397bc8d6 |
| 5ee22b95 | 5f0e5304 | 81ed6f61 | 20e74364 | b45e1378 | de18639b | 881ca122 | b96726d1 | 8049a7e8 | 22b7da7b |
| 5e552d25 | 5272d237 | 79d2951c | c60d894c | 488cb402 | 1ba4fe5b | a4b09f6b | 1ca815cf | a20c3005 | 8871df63 |
| b9de2fcb | 0cc6c9e9 | 0beeff53 | e3214517 | b4542835 | 9f63293c | ee41e729 | 6e1d2d7c | 50045286 | 1e6685f3 |
| f33401c6 | 30a22c95 | 31a70850 | 60930f13 | 73f98417 | a1269859 | ec645c44 | 52c8f7a9 | cdff33a6 | a02b1741 |
| 7cbad9a2 | 2180036f | 50d99c08 | cb3f4861 | c26bd765 | 64a3f6ab | 80342676 | 25a75e7b | e4e6d1fc | 20c710e6 |
| cdf0b680 | 17844d3b | 31eef84d | 7e0824e4 | 2ccb49eb | 846a3bae | 8ff77888 | ee5d60f6 | 7af75673 | 2fdd5cdb |
| a11631c1 | 30f66f43 | b3faec54 | 157fd7fa | ef8579cc | d152de58 | db2ffd5e | 8f32ce19 | 306af97a | 02f03ef8 |
| 99319ad5 | c242fa0f | a7e3ebb0 | c68e4906 | b8da230c | 80823028 | dcdef3c8 | d35fb171 | 088a1bc8 | bec0c560 |
| 61a3c9e8 | bca8f54d | c72feffa | 22822e99 | 82c570b4 | d8d94e89 | 8b1c34bc | 301e16e6 | 273be979 | b0ffeaa6 |
| 61d9b8c6 | 00b24869 | b7ffce3f | 08dc283b | 43daf65a | f7e19798 | 7619b72f | 8f1c9ba4 | dc8637a0 | 16a7d3b1 |

APPENDIX-continued

| | | | | | | | | |
|---|---|---|---|---|---|---|---|---|
| 9fc393b7 | a7136eeb | c6bcc63e | 1a513742 | ef6828bc | 520365d6 | 2d6a77ab | 3527ed4b | 821fd216 | 095c6e2e |
| db92f2fb | 5eea29cb | 145892f5 | 91584f7f | 5483697b | 2667a8cc | 85196048 | 8c4bacea | 833860d4 | 0d23e0f9 |
| 6c387e8a | 0ae6d249 | b284600c | d835731d | dcb1c647 | ac4c56ea | 3ebd81b3 | 230eabb0 | 6438bc87 | f0b5b1fa |
| 8f5ea2b3 | fc184642 | 0a036b7a | 4fb089bd | 649da589 | a345415e | 5c038323 | 3e5d3bb9 | 43d79572 | 7e6dd07c |
| 06dfdf1e | 6c6cc4ef | 7160a539 | 73bfbe70 | 83877605 | 4523ecf1 | | | | |

S-Box S3 (Example 2)

| | | | | | | | | |
|---|---|---|---|---|---|---|---|---|
| 8defc240 | 25fa5d9f | eb903dbf | e810c907 | 47607fff | 369fe44b | 8c1fc644 | aececa90 | beb1f9bf | eefbcaea |
| e8cf1950 | 51df07ae | 920e8806 | f0ad0548 | e13c8d83 | 927010d5 | 11107d9f | 07647db9 | b2e3e4d4 | 3d4f285e |
| b9afa820 | fade82e0 | a067268b | 8272792e | 553fb2c0 | 489ae22b | d4ef9794 | 125e3fbc | 21fffcee | 825b1bfd |
| 9255c5ed | 1257a240 | 4e1a8302 | bae07fff | 528246e7 | 8e57140e | 3373f7bf | 8c9f8188 | a6fc4ee8 | c982b5a5 |
| a8c01db7 | 579fc264 | 67094f31 | f2bd3f5f | 40fff7c1 | 1fb78dfc | 8e6bd2c1 | 437be59b | 99b03dbf | b5dbc64b |
| 638dc0e6 | 55819d99 | a197c81c | 4a012d6e | c5884a28 | ccc36f71 | b843c213 | 6c0743f1 | 8309893c | 0feddd5f |
| 2f7fe850 | d7c07f7e | 02507fbf | 5afb9a04 | a747d2d0 | 1651192e | af70bf3e | 58c31380 | 5f98302e | 727cc3c4 |
| 0a0fb402 | 0f7fef82 | 8c96fdad | 5d2c2aae | 8ee99a49 | 50da88b8 | 8427f4a0 | 1eac5790 | 796fb449 | 8252dc15 |
| efbd7d9b | a672597d | ada840d8 | 45f54504 | fa5d7403 | e83ec305 | 4f91751a | 925669c2 | 23efe941 | a903f12e |
| 60270df2 | 0276e4b6 | 94fd6574 | 927985b2 | 8276dbcb | 02778176 | f8af918d | 4e48f79e | 8f616ddf | e29d840e |
| 842f7d83 | 340ce5c8 | 96bbb682 | 93b4b148 | ef303cab | 984faf28 | 779faf9b | 92dc560d | 224d1e20 | 8437aa88 |
| 7d29dc96 | 2756d3dc | 8b907cee | b51fd240 | e7c07ce3 | e566b4a1 | c3e9615e | 3cf8209d | 6094d1e3 | cd9ca341 |
| 5c76460e | 00ea983b | d4d67881 | fd47572c | f76cedd9 | bda8229c | 127dadaa | 438a074e | 1f97c090 | 081bdb8a |
| 93a07ebe | b938ca15 | 97b03cff | 3dc2c0f8 | 8d1ab2ec | 64380e51 | 68cc7bfb | d90f2788 | 12490181 | 5de5ffd4 |
| dd7ef86a | 76a2e214 | b9a40368 | 925d958f | 4b39fffa | ba39aee9 | a4ffd30b | faf7933b | 6d498623 | 193cbcfa |
| 27627545 | 825cf47a | 61bd8ba0 | d11e42d1 | cead04f4 | 127ea392 | 10428db7 | 8272a972 | 9270c4a8 | 127de50b |
| 285ba1c8 | 3c62f44f | 35c0eaa5 | e805d231 | 428929fb | b4fcdf82 | 4fb66a53 | 0e7dc15b | 1f081fab | 108618ae |
| fcfd086d | f9ff2889 | 694bcc11 | 236a5cae | 12deca4d | 2c3f8cc5 | d2d02dfe | f8ef5896 | e4cf52da | 95155b67 |
| 494a488c | b9b6a80c | 5c8f82bc | 89d36b45 | 3a609437 | ec00c9a9 | 44715253 | 0a874b49 | d773bc40 | 7c34671c |
| 02717ef6 | 4feb5536 | a2d02fff | d2bf60c4 | d43f03c0 | 50b4ef6d | 07478cd1 | 006e1888 | a2e53f55 | b9e6d4bc |
| a2048016 | 97573833 | d7207d67 | de0f8f3d | 72f87b33 | abcc4f33 | 7688c55d | 7b00a6b0 | 947b0001 | 570075d2 |
| f9bb88f8 | 8942019e | 4264a5ff | 856302e0 | 72dbd92b | ee971b69 | 6ea22fde | 5f08ae2b | af7a616d | e5c98767 |
| cf1febd2 | 61efc8c2 | f1ac2571 | cc8239c2 | 67214cb8 | b1e583d1 | b7dc3e62 | 7f10bdce | f90a5c38 | 0ff0443d |
| 606e6dc6 | 60543a49 | 5727c148 | 2be98a1d | 8ab41738 | 20e1be24 | af96da0f | 68458425 | 99833be5 | 600d457d |
| 282f9350 | 8334b362 | d91d1120 | 2b6d8da0 | 642b1e31 | 9c305a00 | 52bce688 | 1b03588a | f7baefd5 | 4142ed9c |
| a4315c11 | 83323ec5 | dfef4636 | a133c501 | e9d3531c | ee353783 | | | | |

S-Box S4 (Example 2)

| | | | | | | | | |
|---|---|---|---|---|---|---|---|---|
| 9db30420 | 1fb6e9de | a7be7bef | d273a298 | 4a4f7db6 | 64ad8c57 | 85510443 | fa020ed1 | 7e287aff | e60fb663 |
| 095f35a1 | 79ebf120 | fd059d43 | 6497b7b1 | f3641f63 | 241e4adf | 28147f5f | 4fa2b8cd | c9430040 | 0cc32220 |
| fdd30b30 | c0a5374f | 1d2d00d9 | 24147b15 | ee4d111a | 0fca5167 | 71ff904c | 2d195ffe | 1a05645f | 0c13fefe |
| 081b08ca | 05170121 | 80530100 | e83e5efe | ac9af4f8 | 7fe72701 | d2b8ee5f | 06df4261 | bb9e9b8a | 7293ea25 |
| ce84ffdf | f5718801 | 3dd64b04 | a26f263b | 7ed48400 | 547eebe6 | 446d4ca0 | 6cf3d6f5 | 2649abdf | aea0c7f5 |
| 36338cc1 | 503f7e93 | d3772061 | 11b638e1 | 72500e03 | f80eb2bb | abe0502e | ec8d77de | 57971e81 | e14f6746 |
| c9335400 | 6920318f | 081dbb99 | ffc304a5 | 4d351805 | 7f3d5ce3 | a6c866c6 | 5d5bcca9 | daec6fea | 9f926f91 |
| 9f46222f | 3991467d | a5bf6d8e | 1143c44f | 43958302 | d0214eeb | 022083b8 | 3fb6180c | 18f8931e | 281658e6 |
| 26486e3e | 8bd78a70 | 7477e4c1 | b506e07c | f32d0a25 | 79098b02 | e4eabb81 | 28123b23 | 69dead38 | 1574ca16 |
| df871b62 | 211c40b7 | a51a9ef9 | 0014377b | 041e8ac8 | 09114003 | bd59e4d2 | e3d156d5 | 4fe876d5 | 2f91a340 |
| 557be8de | 00eae4a7 | 0ce5c2ec | 4db4bba6 | e756bdff | dd3369ac | ec17b035 | 06572327 | 99afc8b0 | 56c8c391 |
| 6b65811c | 5e146119 | 6e85cb75 | be07c002 | c2325577 | 893ff4ec | 5bbfc92d | d0ec3b25 | b7801ab7 | 8d6d3b24 |
| 20c763ef | c366a5fc | 9c382880 | 0ace3205 | aac9548a | eca1d7c7 | 041afa32 | 1d16625a | 6701902c | 9b757a54 |
| 31d477f7 | 9126b031 | 36cc6fdb | c70b8b46 | d9e66a48 | 56e55a79 | 026a4ceb | 52437eff | 2f8f76b4 | 0df980a5 |
| 8674cde3 | edda04eb | 17a9be04 | 2c18f4df | b7747f9d | ab2af7b4 | efc34d20 | 2e096b7c | 1741a254 | e5b6a035 |
| 213d42f6 | 2c1c7c26 | 61c2f50f | 6552daf9 | d2c231f8 | 25130f69 | d8167fa2 | 0418f2c8 | 001a96a6 | 0d1526ab |
| 63315c21 | 5e0a72ec | 49bafefd | 187908d9 | 8d0dbd86 | 311170a7 | 3e9b640c | cc3e10d7 | d5cad3b6 | 0caec388 |
| f73001e1 | 6c728aff | 1f9af36e | fe2ae2a1 | f9df5b4d | cfcbd12f | c1de8417 | ac07be6b | cd44a1d8 | 8b9b0f56 | 013988c3 |
| b1c52fca | b4be31cd | d8782806 | 12a3a4e2 | 6f7de532 | 58fd7eb6 | d01ee900 | 24adffc2 | f4990fc5 | 9711aac5 |
| 001d7b95 | 82e5e7d2 | 109873f6 | 00613096 | c32d9521 | ada121ff | 29908415 | 7fbb977f | af9eb3db | 29c9ed2a |
| 5ce2a465 | a730f32c | d0aa3fe8 | 8a5cc091 | d49e2ce7 | 0ce454a9 | d60acd86 | 015f1919 | 77079103 | dea03af6 |
| 78a8565e | dee356df | 21ff05cbe | 8b75e387 | b3c50651 | b8a5c3ef | d8eeb6d2 | e523be77 | c2154529 | 2f69efdf |
| afe67afb | f470c4b2 | f3e0eb5b | d6cc9876 | 39e4460c | 1fda8538 | 1987832f | ca007367 | a99144f8 | 296b299e |
| 492fc295 | 9266beab | b5676e69 | 9bd3ddda | df7e052f | db25701c | 1b5e51ee | f65324e6 | 6afce36c | 0316cc04 |
| 8644213e | b7dc59d0 | 7965291f | ccd6fd43 | 41823979 | 932bcdf6 | b657c34d | 4edfd282 | 7ae5290c | 3cb9536b |
| 851e20fe | 9833557e | 13ecf0b0 | d3ffb372 | 3f85c5c1 | 0aef7ed2 | | | | |

S-Box S5 (Example 2)

| | | | | | | | | |
|---|---|---|---|---|---|---|---|---|
| 7ec90c04 | 2c6e74b9 | 9b0e66df | a6337911 | b86a7fff | 1dd358f5 | 44dd9d44 | 1731167f | 08fbf1fa | e7f511cc |
| d2051b00 | 735aba00 | 2ab722d8 | 386381cb | acf6243a | 69befd7a | e6a2e77f | f0c720cd | c4494816 | ccf5c180 |
| 38851640 | 15b0a848 | e68b18cb | 4caadeff | 5f480a01 | 0412b2aa | 259814fc | 41d0efe2 | 4e40b48d | 248eb6fb |
| 8dba1cfe | 41a99b02 | 1a550a04 | ba8f65cb | 7251f4e7 | 95a51725 | c106ecd7 | 97a5980a | c539b9aa | 4d79fe6a |
| f2f3f763 | 68af8040 | ed0c9e56 | 11b4958b | e1eb5a88 | 8709e6b0 | d7e07156 | 4e29fea7 | 6366e52d | 02d1c000 |
| c4ac8e05 | 9377f571 | 0c05372a | 578535f2 | 2261be02 | d642a0c9 | df13a280 | 74b55bd2 | 682199c0 | d421e5ec |
| 53fb3ce8 | c8adedb3 | 28a87fc9 | 3d959981 | 5c1ff900 | fe38d399 | 0c4eff0b | 062407ea | aa2f4fb1 | 4fb96976 |
| 90c79505 | b0a8a774 | ef55a1ff | e59ca2c2 | a6b62d27 | e66a4263 | df65001f | 0ec50966 | dfdd55bc | 29de0655 |
| 911e739a | 17af8975 | 32c7911c | 89f89468 | 0d01e980 | 524755f4 | 03b63cc9 | 0cc844b2 | bcf3f0aa | 87ac36e9 |
| e53a7426 | 01b3d82b | 1a9e7449 | 64ee2d7e | cddbb1da | 01c94910 | b868bf80 | 0d26f3fd | 9342ede7 | 04a5c284 |
| 636737b6 | 50f5b616 | f24766e3 | 8eca36c1 | 136e05db | fef18391 | fb887a37 | d6e7f7d4 | c7fb7dc9 | 3063fcdf |
| b6f589de | ec2941da | 26e46695 | b7566419 | f654efc5 | d08d58b7 | 48925401 | c1bacb7f | e5ff550f | b6083049 |
| 5bb5d0e8 | 87d72e5a | ab6a6ee1 | 223a66ce | c62bf3cd | 9e0885f9 | 68cb3e47 | 086c010f | a21de820 | d18b69de |
| f3f65777 | fa02c3f6 | 407edac3 | cbb3d550 | 1793084d | b0d70eba | 0ab378d5 | d951fb0c | ded7da56 | 4124bbe4 |
| 94ca0b56 | 0f5755d1 | e0e1e56e | 6184b5be | 580a249f | 94f74bc0 | e327888e | 9f7b5561 | c3dc0280 | 05687715 |
| 646c6bd7 | 44904db3 | 66b4f0a3 | c0f1648a | 697ed5af | 49e92ff6 | 309e374f | 2cb6356a | 85808573 | 4991f840 |

APPENDIX-continued

| | | | | | | | | | |
|---|---|---|---|---|---|---|---|---|---|
| 76f0ae02 | 083be84d | 28421c9a | 44489406 | 736e4cb8 | c1092910 | 8bc95fc6 | 7d869cf4 | 134f616f | 2e77118d |
| b31b2be1 | aa90b472 | 3ca5d717 | 7d161bba | 9cad9010 | af462ba2 | 9fe459d2 | 45d34559 | d9f2da13 | dbc65487 |
| f3e4f94e | 176d486f | 097c13ea | 631da5c7 | 445f7382 | 175683f4 | cdc66a97 | 70be0288 | b3cdcf72 | e65d2f3 |
| 20936079 | 459b80a5 | be60e2db | a9c23101 | eba5315c | 224e42f2 | 1c5c1572 | f6721b2c | 1ad2fff3 | 8c25404e |
| 324ed72f | 4067b7fd | 0523138e | 5ca3bc78 | dc0fd66e | 75922283 | 784d6b17 | 58ebb16e | 44094f85 | 3f481d87 |
| fcfeae7b | 77b5ff76 | 8c2302bf | aaf47556 | 5f46b02a | 2b092801 | 3d38f5f7 | 0ca81f36 | 52af4a8a | 66d5e7c0 |
| df3b0874 | 95055110 | 1b5ad7a8 | f61ed5ad | 6cf6e479 | 20758184 | d0cefa65 | 88f7be58 | 4a046826 | 0ff6f8f3 |
| a09c7f70 | 5346aba0 | 5ce96c28 | e176eda3 | 6bac307f | 376829d2 | 85360fa9 | 17e3fe2a | 24b79767 | f5a96b20 |
| d6cd2595 | 68ff1ebf | 7555442c | f19f06be | f9e0659a | eeb9491d | 34010718 | bb30cab8 | e822fe15 | 88570983 |
| 750e6249 | da627e55 | 5e76ffa8 | b1534546 | 6d47de08 | efe9e7d4 | | | | |

S-Box S6 (Example 2)

| | | | | | | | | | |
|---|---|---|---|---|---|---|---|---|---|
| f6fa8f9d | 2cac6ce1 | 4ca34867 | e2337f7c | 95db08e7 | 016843b4 | eced5cbc | 325553ac | bf9f0960 | dfa1e2ed |
| 83f0579d | 63ed86b9 | 1ab6a6b8 | de5ebe39 | f38ff732 | 8989b138 | 33f14961 | c01937bd | f506c6da | e4625e7e |
| a308ea99 | 4e23e33c | 79cbd7cc | 48a14367 | a3149619 | fec94bd5 | a114174a | eaa01866 | a084db2d | 09a8486f |
| a888614a | 2900af98 | 01665991 | e1992863 | c8f30c60 | 2e78ef3c | d0d51932 | cf0fec14 | f7ca07d2 | d0a82072 |
| fd41197e | 9305a6b0 | e86be3da | 74bed3cd | 372da53c | 4c7f4448 | dab5d440 | 6dba0ec3 | 083919a7 | 9fbaeed9 |
| 49dbcfb0 | 4e670c53 | 5c3d9c01 | 64bdb941 | 2c0e636a | ba7dd9cd | ea6f7388 | e70bc762 | 35f29adb | 5c4cdd8d |
| f0d48d8c | b88153e2 | 08a19866 | 1ae2eac8 | 284caf89 | aa928223 | 9334be53 | 3b3a21bf | 16434be3 | 9aea3906 |
| efe8c36e | f890cdd9 | 80226dae | c340a4a3 | df7e9c09 | a694a807 | 5b7c5ecc | 221db3a6 | 9a69a02f | 68818a54 |
| ceb2296f | 53c0843a | fe893655 | 25bfe68a | b4628abc | cf222ebf | 25ac6f48 | a9a99387 | 53bddb65 | e76ffbe7 |
| e967fd78 | 0ba93563 | 8e342bc1 | e8a11be9 | 4980740d | c8087dfc | 8de4bf99 | a11101a0 | 7fd37975 | da5a26c0 |
| e81f994f | 9528cd89 | fd339fed | b87834bf | 5f04456d | 22258698 | c9c4c83b | 2dc156be | 4f628daa | 57f55ec5 |
| e2220abe | d2916ebf | 4ec75b95 | 24f2c3c0 | 42d15d99 | cd0d7fa0 | 7b6e27ff | a8dc8af0 | 7345c106 | f41e232f |
| 35162386 | e6ea8926 | 3333b094 | 157ec6f2 | 372b74af | 692573e4 | e9a9d848 | f3160289 | 3a62ef1d | a787e238 |
| f3a5f676 | 74364853 | 20951063 | 4576698d | b6fad407 | 592af950 | 36f73523 | 4cfb6e87 | 7da4cec0 | 6c152daa |
| cb0396a8 | c50dfe5d | fcd707ab | 0921c42f | 89dff0bb | 5fe2be78 | 448f4f33 | 754613c9 | 2b05d08d | 48b9d585 |
| dc049441 | c8098f9b | 7dede786 | c39a3373 | 42410005 | 6a091751 | 0ef3c8a6 | 890072d6 | 28207682 | a9a9f7be |
| bf32679d | d45b5b75 | b353fd00 | cbb0e358 | 830f220a | 1f8fb214 | d372cf08 | cc3c4a13 | 8cf63166 | 061c87be |
| 88c98f88 | 6062e397 | 47cf8e7a | b6c85283 | 3cc2acfb | 3fc06976 | 4e8f0252 | 64d8314d | da3870e3 | 1e665459 |
| c10908f0 | 513021a5 | 6c5b68b7 | 822f8aa0 | 3007cd3e | 74719eef | dc872681 | 073340d4 | 7e432fd9 | 0c5ec241 |
| 8809286c | f592d891 | 08a930f6 | 957ef305 | b7bfffbd | c266e96f | 6fe4ac98 | b173ecc0 | bc60b42a | 953498da |
| fba1ae12 | 2d4bd736 | 0f25faab | a4f3fceb | e2969123 | 257f0c3d | 9348af49 | 361400bc | e8816f4a | 3814f200 |
| a3f94043 | 9c7a54c2 | bc704f57 | da41e7f9 | c25ad33a | 54f4a084 | b17f5505 | 59357cbe | edbd15c8 | 7f97c5ab |
| ba5ac7b5 | b6f6deaf | 3a479c3a | 5302da25 | 653d7e6a | 54268d49 | 51a477ea | 5017d55b | d7d25d88 | 44136c76 |
| 0404abc8 | b8e5a121 | b81a928a | 60ed5869 | 97c55b96 | eaec991b | 29935913 | 01fdb7f1 | 088e8dfa | 9ab6f6f5 |
| 3b4cbf9f | 4a5de3ab | e6051d35 | a0e1d855 | d36b4cf1 | f544edeb | b0e93524 | bebb8fbd | a2d762cf | 49c92f54 |
| 38b5f331 | 7128a454 | 48392905 | a65b1db8 | 851c97bd | d675cf2f | | | | |

S-Box S7 (Example 2)

| | | | | | | | | | |
|---|---|---|---|---|---|---|---|---|---|
| 85e04019 | 332bf567 | 662dbfff | cfc65693 | 2a8d7f6f | ab9bc912 | de6008a1 | 2028da1f | 0227bce7 | 4d642916 |
| 18fac300 | 50f18b82 | 2cb2cb11 | b232e75c | 4b3695f2 | b28707de | a05fbcf6 | cd4181e9 | e150210c | e24ef1bd |
| b168c381 | fde4e789 | 5c79b0d8 | 1e8bfd43 | 4d495001 | 38be4341 | 913cee1d | 92a79c3f | 089766be | baeeadf4 |
| 1286becf | b6eacb19 | 2660c200 | 7565bde4 | 64241f7a | 8248dca9 | c3b3ad66 | 28136086 | 0bd8dfa8 | 356d1cf2 |
| 107789be | b3b2e9ce | 0502aa8f | 0bc0351e | 166bf52a | eb12ff82 | e3486911 | d34d7516 | 4e7b3aff | 5f43671b |
| 9cf6e037 | 4981ac83 | 334266ce | 8c9341b7 | d0d854c0 | cb3a6c88 | 47bc2829 | 4725ba37 | a66ad22b | 7ad61f1e |
| 0c5cbafa | 4437f107 | b6e79962 | 42d2d816 | 0a961288 | e1a5c06e | 13749e67 | 72fc081a | b1d139f7 | f9583745 |
| cf19df58 | bec3f756 | c06eba30 | 07211b24 | 45c28829 | c95e317f | bc8ec511 | 38bc46e9 | c6e6fa14 | bae8584a |
| ad4ebc46 | 468f508b | 7829435f | f124183b | 821dba9f | aff60ff4 | ea2c4e6d | 16e39264 | 92544a8b | 009b4fc3 |
| aba68ced | 9ac96f78 | 06a5b79a | b2856e6e | 1aec3ca9 | be838688 | 0e0804e9 | 55f1be56 | e7e5363b | b3a1f25d |
| f7debb85 | 61fe033c | 16746233 | 3c034c28 | da6d0c74 | 79aac56c | 3ce4e1ad | 51f0c802 | 98f8f35a | 1626a49f |
| eed82b29 | 1d382fe3 | 0c4fb99a | bb325778 | 3ec6d97b | 6e77a6a9 | cb658b5c | d45230c7 | 2bd1408b | 60c03eb7 |
| b9068d78 | a33754f4 | ca8a71302 | b96d8c32 | eb6d4be | 8e8b9d2d | 7979fb06 | e7225308 | 8b75cf77 | |
| 11ef8da4 | e083c858 | 8d6b786f | 5a6317a6 | fa5cf7a0 | 5dda0033 | f28ebfb0 | f5b9c310 | a0eac280 | 08b9767a |
| a3d9d2b0 | 79d34217 | 021a718d | 9ac6336a | 2711fd60 | 438050e3 | 069908a8 | 3d7fedc4 | 826d2bef | 4eeb8476 |
| 488dcf25 | 36c9d566 | 28e74e41 | c2610aca | 3d49a9cf | bae3b9df | b65f8de6 | 92aeaf64 | 3ac7d5e6 | 9ea80509 |
| f22b017d | a4173f70 | dd1e16c3 | 15e0d7f9 | 50b1b887 | 2b9f4fd5 | 625aba82 | 6a017962 | 2ec01b9c | 15488aa9 |
| d716e740 | 40055a2c | 93d29a22 | e32dbf9a | 058745b9 | 3453dc1e | d699296e | 496cff6f | 1c9f4986 | dfe2ed07 |
| b87242d1 | 19de7eae | 053e561a | 15ad6f8c | 66626c1c | 7154c24c | ea082b2a | 93eb2939 | 17dcb0f0 | 58d4f2ae |
| 9ea294fb | 52cf564c | 9883fe66 | 2ec40581 | 763953c3 | 01d6692e | d3a0c108 | a1e7160e | e4f2dfa6 | 693ed285 |
| 74904698 | 4c2b0edd | 4f757656 | 5d393378 | a132234f | 3d321c5d | c3f5e194 | 8b269301 | c79f022f | 3c997e7e |
| 5e4f9504 | 3ffafbbd | 76f7ad0e | 296693f4 | 3d1fce6f | c61e45be | d3b5ab34 | f72bf9b7 | 1b0434c0 | 4e72b567 |
| 5592a33d | b5229301 | cfd2a87f | 60aeb767 | 1814386b | 30bcc33d | 38a0c07d | fd1606f2 | c363519b | 589dd390 |
| 5479f8e6 | 1cb8d647 | 97fd61a9 | ea7759f4 | 2d57539d | 569a58cf | e84e63ad | 462e1b78 | 6580f87e | f3817914 |
| 91da55f4 | 40a230f3 | d1988f35 | b6e318d2 | 3ffa50bc | 3d40f021 | c3c0bdae | 4958c24c | 518f36b2 | 84b1d370 |
| 0fedce83 | 878ddada | f2a279c7 | 94e01be8 | 90716f4b | 954b8aa3 | | | | |

S-Box S8 (Example 2)

| | | | | | | | | | |
|---|---|---|---|---|---|---|---|---|---|
| e216300d | bbddfffc | a7ebdabd | 35648095 | 7789f8b7 | e6c1121b | 0e241600 | 052ce8b5 | 11a9cfb0 | e5952f11 |
| ece7990a | 9386d174 | 2a42931c | 76e38111 | b12def3a | 37ddddfc | de9adeb1 | 0a0cc32c | be197029 | 84a00940 |
| bb243a0f | b4d137cf | b44e79f0 | 049eefdf | 0b15a15d | 480d3168 | 8bbbde5a | 669ded42 | c7ece831 | 3f8f95e7 |
| 72df191b | 7580330d | 94074251 | 5c7dcdfa | abbe6d63 | aa402164 | b301d40a | 02e7d1ca | 53571dae | 7a3182a2 |
| 12a8ddec | fdaa335d | 176f43e8 | 71fb46d4 | 38129022 | ce949ad4 | b8e4769a | 965bd862 | 82f3d055 | 66fb9767 |
| 15b80b4e | 1d5b47a0 | 4cfde06f | c28ec4b8 | 57e8726e | 647a78fc | 99865d44 | 608bd593 | 6c200e03 | 39dc5ff6 |
| 5d0b00a3 | ae63aff2 | 7e8bd632 | 70108c0c | bbd35049 | 2998df04 | 980cf42a | 9b6df491 | 9e7edd53 | 06918548 |
| 58cb7e07 | 3b74ef2e | 522fffb1 | d24708cc | 1c7e27cd | a4eb215b | 3cf1d2e2 | 19b47a38 | 424f7618 | 35856039 |
| 9d17dee7 | 27eb35e6 | c9aff67b | 36baf5b8 | 09c467cd | c18910b1 | e11dbf7b | 06cd1af8 | 7170c608 | 2d5e3354 |
| d4de495a | 64c6d006 | bcc0c62c | 3dd00db3 | 708f8f34 | 77d51b42 | 264f620f | 24b8d2bf | 15c1b79e | 46a52564 |
| f8d7e54e | 3e378160 | 7895cda5 | 859c15a5 | e6459788 | c37bc75f | db07ba0c | 0676a3ab | 7f229b1e | 31842e7b |

APPENDIX-continued

| | | | | | | | | | |
|---|---|---|---|---|---|---|---|---|---|
| 24259fd7 | f8bef472 | 835ffcb8 | 6df4c1f2 | 96f5b195 | fd0af0fc | b0fe134c | e2506d3d | 4f9b12ea | f215f225 |
| a223736f | 9fb4c428 | 25d04979 | 34c713f8 | c4618187 | ea7a6e98 | 7cd16efc | 1436876c | f1544107 | bedeee14 |
| 56e9af27 | a04aa441 | 3cf7c899 | 92ecbae6 | dd67016d | 151682eb | a842eedf | fdba60b4 | f1907b75 | 20e3030f |
| 24d8c29e | e139673b | efa63fb8 | 71873054 | b6f2cf3b | 9f326442 | cb15a4cc | b01a4504 | f1e47d8d | 844a1be5 |
| bae7dfdc | 42cbda70 | cd7dae0a | 57e85b7a | d53f5af6 | 20cf4d8c | cea4d428 | 79d130a4 | 3486ebfb | 33d3cddc |
| 77853b53 | 37effcb5 | c5068778 | e580b3e6 | 4e68b8f4 | c5c8b37e | 0d809ea2 | 398feb7c | 132a4f94 | 43b7950e |
| 2fee7d1c | 223613bd | dd06caa2 | 37df932b | c4248289 | acf3ebc3 | 5715f6b7 | ef3478dd | f267616f | c148cbe4 |
| 9052815e | 5e410fab | b48a2465 | 2eda7fa4 | e87b40e4 | e98ea084 | 5889e9e1 | efd390fc | dd07d35b | db485694 |
| 38d7e5b2 | 57720101 | 730edebc | 5b643113 | 94917e4f | 503c2fba | 646f1282 | 7523d24a | e0779695 | f9c17a8f |
| 7a5b2121 | d187b896 | 29263a4d | ba510cdf | 81f47c9f | ad1163ed | ea7b5965 | 1a00726e | 11403092 | 00da6d77 |
| 4a0cdd61 | ad1f4603 | 605bdfb0 | 9eedc364 | 22ebe6a8 | cee7d28a | a0e736a0 | 5564a6b9 | 10853209 | c7eb8f37 |
| 2de705ca | 8951570f | df09822b | bd691a6c | aa12e4f2 | 87451c0f | e0f6a27a | 3ada4819 | 4cf1764f | 0d771c2b |
| 67cdb156 | 350d8384 | 5938fa0f | 42399ef3 | 36997b07 | 0e84093d | 4aa93a61 | 8360d87b | 1fa98b0c | 1149382c |
| e97625a5 | 0614d1b7 | 0e25244b | 0c768347 | 589e8d82 | 0d2059d1 | a466bb1e | f8da0a82 | 04f19130 | ba6e4ec0 |
| 99265164 | 1ee7230d | 50b2ad80 | eaee6801 | 8db2a283 | ea8bf59e | | | | |

What is claimed is:

1. In a data encryption method of cryptographically transforming plaintext into ciphertext in data blocks of a predetermined bitlength comprising a plurality of consecutive transformation rounds of half of each data block, each consecutive transformation round comprising steps of:

combining the half data block with a first masking key of predetermined length using a first binary operation to generate a first modified half data block;

combining the first modified half data block with a second masking key of predetermined length using a second and different binary operation to generate a second modified half data block;

processing the second modified half data block by a plurality of (m×n) mutually different substitution boxes to generate a third modified half data block, m and n being positive integers; and     XORing the third modified half data block with the remaining half of the data block to generate a transformed half data block of a transformation round.

2. The data encryption method of cryptographically transforming plaintext into ciphertext in data blocks of predetermined bitlength according to claim 1, wherein the first binary operation is addition modulo $2^n$, or subtraction modulo $2^n$, or bitwise XOR, and the second binary operation is multiplication modulo ($2^n-1$), or multiplication modulo ($2^n+1$).

3. The data encryption method of cryptographically transforming plaintext into ciphertext in data blocks of predetermined bitlength according to claim 1, wherein the first binary operation is addition modulo $2^n$, or subtraction modulo $2^n$, or bitwise XOR, and the second binary operation is a circular shift by a number of bits specified by the second masking key.

4. The data encryption method of cryptographically transforming plaintext into ciphertext in data blocks of predetermined bitlength according to claim 1, wherein all first masking keys and all second masking keys for all the transformation rounds are generated before the first transformation round is performed.

5. The data encryption method of cryptographically transforming plaintext into ciphertext in data blocks of predetermined bitlength according to claim 4, wherein all first masking keys and all second masking keys for all the transformation rounds are generated by a plurality of partially bent-function-based (m×n) substitution boxes from the key bits, where the key bits comprise a key pattern of z bytes in the following order: k1, k2, k3, . . . , k(z−1), kz, z being a positive integer.

6. The data encryption method of cryptographically transforming plaintext into ciphertext in data blocks of predetermined bitlength according to claim 5, wherein each data block contains 64 bits, the substitution boxes are eight partially bent-function-based 8×32 s-boxes, S1, S2, S3, . . . , S8, and the key bits comprise a key pattern of 10 bytes in the following order: k1, k2, k3, . . . , k9, k0.

7. The data encryption method of cryptographically transforming plaintext into ciphertext in data blocks of predetermined bitlength according to claim 6, wherein the transformation round function means has a first plurality of partially bent-function-based (m×n) s-boxes for processing key bits to generate a first masking key and a second masking key, and a second plurality of partially bent-function-based (m×n) s-boxes for processing the second modified data half.

8. The data encryption method of cryptographically transforming plaintext into ciphertext in data blocks of predetermined bitlength according to claim 7, wherein the first plurality of s-boxes comprises four partially bent-function-based 8×32 s-boxes and the second plurality of s-boxes comprises four partially bent-function-based 8×32 s-boxes.

9. The data encryption method of cryptographically transforming plaintext into ciphertext in data blocks of predetermined bitlength according to claim 5, wherein the transformation round function means has a first plurality of partially bent-function-based (m×n) s-boxes for processing key bits to generate a first masking key and a second masking key, and a second plurality of partially bent-function-based (m×n) s-boxes for processing the second modified data half.

10. The data encryption method of cryptographically transforming plaintext into ciphertext in data blocks of predetermined bitlength according to claim 1, wherein one or more consecutive transformation rounds include mutually different sets of first and second binary operations.

11. The data encryption method of cryptographically transforming plaintext into ciphertext in data blocks of predetermined bitlength according to claim 10, wherein particular binary operations for use in any particular round are chosen in dependence upon the value of certain predetermined bits of the first masking key or the second masking key, or upon the value of certain predetermined bits of the half data block being operated upon.

12. The data encryption method of cryptographically transforming plaintext into ciphertext in data blocks of predetermined bitlength according to claim 10, wherein particular binary operations for use in each transformation round are fully specified for all implementations of the method and is independent of any key bits or data bits.

13. The data encryption method of cryptographically transforming plaintext into ciphertext in data blocks of predetermined bitlength according to claim 12, wherein the binary operations addition modulo $2^n$, subtraction modulo 2", and bitwise XOR can be used to combine the half data block with the first masking key and to combine the s-box outputs which result from the processing of the second modified half data block.

14. The data encryption method of cryptographically transforming plaintext into ciphertext in data blocks of predetermined bitlength according to claim 13, wherein three different transformation rounds are used:

Type 1: I=((Kmi+D)<<<Kri) O=((S1[Ia]^S2[Ib])−S3[Ic])+S4[Id]

Type 2: I=((Kmi^D)<<<Kri) O=((S1[Ia]−S2[Ib])+S3[Ic])^S4[Id]

Type 3: I=((Kmi−D)<<<Kri) O=((S1[Ia]+S2[Ib])^S3[Ic])−S4[Id]

where "D" is the original input to the transformation round, "Ia",–"Id", are the most significant byte through least significant byte of I, respectively, and "O", is the output of the transformation round and "+", and "−", are addition and subtraction modulo $2^{32}$, "^", is bitwise XOR, and "<<<", is the circular left-shift operation.

15. The data encryption method of cryptographically transforming plaintext into ciphertext in data blocks of predetermined bitlength according to claim 14, wherein twelve transformation rounds are used in total and rounds 1, 4, 7, and 10 use transformation round Type 1, rounds 2, 5, 8, and 11 use transformation round Type 2, and rounds 3, 6, 9, and 12 use transformation round Type 3.

* * * * *